(12) United States Patent
Chuang et al.

(10) Patent No.: US 10,820,017 B2
(45) Date of Patent: Oct. 27, 2020

(54) METHOD AND APPARATUS OF VIDEO CODING

(71) Applicant: MEDIATEK INC., Hsinchu (TW)

(72) Inventors: Tzu-Der Chuang, Hsinchu (TW); Ching-Yeh Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/919,911

(22) Filed: Mar. 13, 2018

(65) Prior Publication Data

US 2018/0270509 A1 Sep. 20, 2018

Related U.S. Application Data

(60) Provisional application No. 62/471,388, filed on Mar. 15, 2017.

(51) Int. Cl.
| | |
|---|---|
| *H04N 19/186* | (2014.01) |
| *H04N 19/96* | (2014.01) |
| *H04N 19/119* | (2014.01) |
| *H04N 19/176* | (2014.01) |
| *H04N 19/46* | (2014.01) |
| *H04N 19/423* | (2014.01) |

(52) U.S. Cl.
CPC ........... *H04N 19/96* (2014.11); *H04N 19/119* (2014.11); *H04N 19/176* (2014.11); *H04N 19/186* (2014.11); *H04N 19/423* (2014.11); *H04N 19/46* (2014.11)

(58) Field of Classification Search
CPC .. H04N 19/176; H04N 19/186; H04N 19/423; H04N 19/96; H04N 19/119; H04N 19/46
USPC .................................................. 375/240.02
See application file for complete search history.

(56) References Cited

U.S. PATENT DOCUMENTS

| | | | | |
|---|---|---|---|---|
| 2013/0272401 | A1* | 10/2013 | Seregin | H04N 19/13 375/240.12 |
| 2015/0208067 | A1* | 7/2015 | Jung | H04N 19/463 375/240.02 |
| 2015/0319441 | A1* | 11/2015 | Puri | H04N 19/14 375/240.02 |
| 2016/0007050 | A1* | 1/2016 | Rusert | H04N 19/44 375/240.08 |
| 2017/0150186 | A1* | 5/2017 | Zhang | H04N 19/573 |
| 2017/0347128 | A1* | 11/2017 | Panusopone | H04N 19/174 |

(Continued)

*Primary Examiner* — Christopher S Kelley
*Assistant Examiner* — Kathleen M Walsh
(74) *Attorney, Agent, or Firm* — Oblon, McClelland, Maier & Neustadt, L.L.P.

(57) ABSTRACT

Aspects of the disclosure include a video decoding device that includes a processing circuit. The processing circuit is configured to receive encoded video data associated with an image frame that includes an encoded image, which is a combination of at least a first image corresponding to a first color space component of the image frame and a second image corresponding to a second color space component of the image frame, and determine a first coding tree structure for partitioning the first image into a first plurality of coding units. Moreover, the processing circuit is configured to determine a second coding tree structure for partitioning the second image into a second plurality of coding units based on the first plurality of candidate coding units, and reconstruct the second image for output according to the second plurality of coding units.

30 Claims, 10 Drawing Sheets

(56) References Cited

U.S. PATENT DOCUMENTS

| | | | |
|---|---|---|---|
| 2018/0070110 A1* | 3/2018 | Chuang | H04N 19/176 |
| 2018/0176601 A1* | 6/2018 | Jeong | H04N 19/593 |
| 2019/0058881 A1* | 2/2019 | Seo | H04N 19/119 |
| 2019/0379914 A1* | 12/2019 | Misra | H04N 19/132 |

* cited by examiner

METHOD AND APPARATUS OF VIDEO CODING

INCORPORATION BY REFERENCE

This present disclosure claims the benefit of U.S. Provisional Application No. 62/471,388, "Methods of Coding Unit Coding" filed on Mar. 15, 2017, which is incorporated herein by reference in its entirety.

TECHNICAL FIELD

The present disclosure relates to video coding techniques. In particular, the present disclosure relates to block partitioning constraints.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Many video coding standards divide an image frame of an input video into one or more coding tree units (CTUs), and each CTU encodes an original image that can be processed as a combination of three images that respectively correspond to different color space components of a predetermined color space. In some applications, the predetermined color space may include an RGB color space having a red component (R), a green component (G), and a blue component (B); an YCbCr color space having a luma component (Y), a blue-difference chroma component (Cb), and a red-difference chroma component (Cr); a YCoCg color space having a luma component (Y), an orange chroma component (Co), and a green chroma component (Cg); or the like. In some examples, the images of different color space component may have different spatial resolutions with respect to that of the corresponding original image.

In some applications, each image of a particular color component can be coded as a coding tree block (CTB) and can be partitioned into coding units (CUs) according to a coding tree structure, where each node of the coding tree structure corresponds to a subdivision of the image, and each leaf node of the coding tree structure corresponds to a respective one of the coding units of the image. When encoding an image of a coding unit, the image of the coding unit can be divided into a predictable portion and a residual portion (i.e., prediction errors) to be encoded according to a predetermined video coding standard. When decoding the coding unit, a reconstructed image of the coding unit can be obtained by generating and combining the predictable portion and the residual portion of the coding unit according to the same predetermined video coding standard.

SUMMARY

Aspects of the disclosure provide a video decoding device including a processing circuit. The processing circuit is configured to receive encoded video data associated with an image frame that includes an encoded image, which is a combination of at least a first image corresponding to a first color space component of the image frame and a second image corresponding to a second color space component of the image frame, and determine a first coding tree structure for partitioning the first image into a first plurality of coding units. The processing circuit is also configured to determine a second coding tree structure for partitioning the second image into a second plurality of coding units, including determining whether splitting a particular block of the second image into branch candidate coding units is invalid according to corresponding one or more of the first plurality of coding units. Moreover, the processing circuit is configured to reconstruct the second image for output based on the second plurality of coding units.

In an embodiment, the processing circuit is further configured to, for each branch candidate coding unit of a set of next-level branch candidate coding units of the particular block, identify a benchmark coding unit among the first plurality of coding units that corresponds to the branch candidate coding unit, and determine whether a size of the branch candidate coding unit with respect to the encoded image is less than a size of the benchmark coding unit with respect to the encoded image. The processing circuit is further configured to determine the set of next-level branch candidate coding units is invalid in a case that the size of one of the set of next-level branch candidate coding units with respect to the encoded image is less than the size of the corresponding benchmark coding unit with respect to the encoded image.

In an embodiment, the size of a particular branch candidate coding unit of the second image is determined based on an area of a first region in the encoded image that corresponds to the particular branch coding unit, and the size of a benchmark coding unit of the first image is determined based on an area of a second region in the encoded image that corresponds to the benchmark coding unit. In another embodiment, the size of a particular branch candidate coding unit of the second image is determined based on a width or a height of a first region in the encoded image that corresponds to the particular branch coding unit, and the size of a benchmark coding unit of the first image is determined based on a width or a height of a second region in the encoded image that corresponds to the benchmark coding unit.

In an embodiment, whether splitting the particular block of the second image into branch candidate coding units is invalid can be determined to be the same as a corresponding setting of a counterpart block of the first image.

In an embodiment, the processing circuit is further configured to, in a case that splitting the particular block of the second image into branch candidate coding units is determined to be invalid according to a size of the particular block of the second image and a size of a corresponding one of the first plurality of coding units, determine candidate subdivisions of the particular block that are not greater than a predetermined number of splitting level(s) from the particular block as valid. The predetermined number can be one or two.

In an embodiment, the processing circuit is further configured to identify neighboring coding units of the particular block of the second image, the neighboring coding units being adjacent to the particular block, and, in a case that a size of the particular block is greater than, or greater than or equal to, a corresponding size of the identified neighboring coding units, determine that splitting the particular block of the second image into branch candidate coding units is valid.

In an embodiment, the processing circuit is further configured to, in a case that splitting the particular block of the second image into branch candidate coding units is determined to be invalid according to a size of the particular block of the second image and the corresponding size of the identified neighboring coding units, determine candidate subdivisions of the particular block that are not greater than a predetermined number of splitting level(s) from the particular block as valid.

Aspects of the disclosure further provide a video decoding method that includes receiving encoded video data associated with an image frame that includes an encoded image, which is a combination of at least a first image corresponding to a first color space component of the image frame and a second image corresponding to a second color space component of the image frame, and determining, by a processing circuit, a first coding tree structure for partitioning the first image into a first plurality of coding units. The method further includes determining, by the processing circuit, a second coding tree structure for partitioning the second image into a second plurality of coding units, including determining whether splitting a particular block of the second image into branch candidate coding units is invalid according to corresponding one or more of the first plurality of coding units. Moreover the method includes reconstructing the second image for output based on the second plurality of coding units.

In an embodiment, the determining whether splitting a particular block of the second image into branch candidate coding units is invalid can include, for each branch candidate coding unit of a set of next-level branch candidate coding units of the particular block, identifying a benchmark coding unit among the first plurality of coding units that corresponds to the branch candidate coding unit, and determining whether a size of the branch candidate coding unit with respect to the encode image is less than a size of the benchmark coding unit with respect to the encode image. The method can also include determining the set of next-level branch candidate coding units is invalid in a case that the size of one of the set of next-level branch candidate coding units with respect to the encode image is less than the size of the corresponding benchmark coding unit with respect to the encode image.

In an embodiment, the size of a particular branch candidate coding unit of the second image is determined based on an area of a first region in the encoded image that corresponds to the particular branch coding unit, and the size of a benchmark coding unit of the first image is determined based on an area of a second region in the encoded image that corresponds to the benchmark coding unit. In another embodiment, the size of a particular branch candidate coding unit of the second image is determined based on a width or a height of a first region in the encoded image that corresponds to the particular branch coding unit, and the size of a benchmark coding unit of the first image is determined based on a width or a height of a second region in the encoded image that corresponds to the benchmark coding unit.

In an embodiment, whether splitting the particular block of the second image into branch candidate coding units is invalid can be determined to be the same as a corresponding setting of a counterpart block of the first image.

In an embodiment, the method further includes, in a case that splitting the particular block of the second image into branch candidate coding units is determined to be invalid according to a size of the particular block of the second image and a size of a corresponding one of the first plurality of coding units, determining candidate subdivisions of the particular block that are not greater than a predetermined number of splitting level(s) from the particular block as valid. The predetermined number can be one or two.

In an embodiment, the method further includes identifying neighboring coding units of the particular block of the second image, the neighboring coding units being adjacent to the particular block, and, in a case that a size of the particular block is greater than, or greater than or equal to, a corresponding size of the identified neighboring coding units, determining that splitting the particular block of the second image into branch candidate coding units is valid.

In an embodiment, the method further includes, in a case that splitting the particular block of the second image into branch candidate coding units is determined to be invalid according to a size of the particular block of the second image and the corresponding size of the identified neighboring coding units, determining candidate subdivisions of the particular block that are not greater than a predetermined number of splitting level(s) from the particular block as valid.

Aspects of the disclosure provide a video encoding device that includes a processing circuit. The processing circuit is configured to receive an image frame that includes an original image, which is a combination of at least a first image corresponding to a first color space component of the image frame and a second image corresponding to a second color space component of the image frame, and determine a first coding tree structure for partitioning the first image into a first plurality of coding units. The processing circuit is also configured to determine a plurality of candidate coding units for partitioning the second image, including determining whether splitting a particular block into branch candidate coding units is invalid according to corresponding one or more of the first plurality of coding units. Moreover, the processing circuit is configured to determine a second coding tree structure for partitioning the second image into a second plurality of coding units based on the plurality of candidate coding units, and generate encoded data representing the second image for output according to the second plurality of coding units.

In an embodiment, the processing circuit is further configured to, for each branch candidate coding unit of a set of next-level branch candidate coding units of the particular block, identify a benchmark coding unit among the first plurality of coding units that corresponds to the branch candidate coding unit, and determine whether a size of the branch candidate coding unit with respect to the original image is less than a size of the benchmark coding unit with respect to the original image. The processing circuit is further configured to determine the set of next-level branch candidate coding units is invalid in a case that the size of one of the set of next-level branch candidate coding units with respect to the original image is less than the size of the corresponding benchmark coding unit with respect to the original image.

The size of a particular branch candidate coding unit of the second image can be determined based on an area of a first region in the original image that corresponds to the particular branch coding unit; and the size of a benchmark coding unit of the first image can be determined based on an area of a second region in the original image that corresponds to the benchmark coding unit. Also, the size of a particular branch candidate coding unit of the second image can be determined based on a width or a height of a first region in the original image that corresponds to the particular branch coding unit; and the size of a benchmark coding unit of the first image can be determined based on a width or a height of a second region in the original image that corresponds to the benchmark coding unit.

In at least one embodiment, whether splitting the particular block of the second image into branch candidate coding units of the particular candidate coding unit is invalid is determined to be the same as a corresponding setting of a counterpart block of the first image.

In an embodiment, the processing circuit is further configured to determine a set of preliminary candidate coding units for partitioning the second image based on the first coding tree structure, for a leaf candidate coding unit of the set of preliminary candidate coding units, identify extension branch candidate coding units that are not greater than a predetermined number of splitting level(s) from the leaf candidate coding unit, and obtain the plurality of candidate coding units to include the set of preliminary candidate coding units and the identified extension branch candidate coding units. The predetermined number can be one or two.

In an embodiment, the processing circuit is further configured to determine a set of preliminary candidate coding units for partitioning the second image based on the first coding tree structure, and, for a leaf candidate coding unit of the set of preliminary candidate coding units, identify neighboring coding units of the second image, the neighboring coding units being adjacent to the leaf candidate coding unit, and in a case that a size of leaf candidate coding unit is greater than, or greater than or equal to, a corresponding size of the identified neighboring coding units, identify extension branch candidate coding units of the leaf candidate coding unit. The processing circuit can obtain the plurality of candidate coding units to include the set of preliminary candidate coding units and the identified extension branch candidate coding units.

In an embodiment, the processing circuit is further configured to, for the leaf candidate coding unit of the set of preliminary candidate coding units, in the case that the size of leaf candidate coding unit is greater than, or greater than or equal to, the corresponding size of the identified neighboring coding units, identify extension branch candidate coding units of the leaf candidate coding unit that are not greater than a predetermined number of splitting level(s) from the leaf candidate coding unit.

Aspects of the disclosure can further provide a video encoding method that includes receiving an image frame that includes an original image, which is a combination of at least a first image corresponding to a first color space component of the image frame and a second image corresponding to a second color space component of the image frame, and determining a first coding structure for partitioning the first image into a first plurality of coding units. The method includes determining, by a processing circuit, a plurality of candidate coding units for partitioning the second image, including determining whether splitting a particular block into branch candidate coding units is invalid according to corresponding one or more of the first plurality of coding units. The method also includes determining, by the processing circuit, a second coding tree structure for partitioning the second image into a second plurality of coding units based on the plurality of candidate coding units, and generating, by the processing circuit, encoded data representing the second image for output according to the second plurality of coding units.

In an embodiment, the determining whether splitting the particular block into branch candidate coding units is invalid can include, for each branch candidate coding unit of a set of next-level branch candidate coding units of the particular candidate coding unit, identifying a benchmark coding unit among the first plurality of coding units that corresponds to the branch candidate coding unit, and determining whether a size of the branch candidate coding unit with respect to the original image is less than a size of the benchmark coding unit with respect to the original image. The method can further include determining the set of next-level branch candidate coding units is invalid in a case that the size of one of the set of next-level branch candidate coding units with respect to the original image is less than the size of the corresponding benchmark coding unit with respect to the original image.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

In accordance with some examples of the present disclosure, when encoding an image frame, the image frame may be divided into CTUs, which may be further divided into CTBs based on a predetermined color space that has plural color space components. For example, when the image frame uses the YCbCr color space, a CTB of the image frame may correspond to one of the luma component (Y), the blue-difference chroma components (Cb), or the red-difference chroma components (Cr) of the YCbCr color space. An image frame can thus be divided into original images that correspond to various CTUs, and each original image of a CTU can be a combination of a luma (Y) image corresponding to a luma color space component, a blue-difference chroma (Cb) image corresponding to a blue-difference chroma color space component, and a red-difference chroma (Cr) image corresponding to a red-difference chroma color space component.

Moreover, when encoding the image frame, each CTB image can be further divided into one or more coding units based on a predetermined partitioning structure. In some examples, an encoding circuit can determine plural possible combinations of candidate coding units for coding a particular CTB and determine a final coding tree structure for partitioning the image into a plurality of coding units based on analyzing the candidate coding units and one or more predetermined encoding criteria. After determining a first coding tree structure for an image corresponding to a first color space component, such as a luma image of an original image, a second coding tree structure for a counterpart image corresponding to a second color space component, such as a chroma image of the same original image, can be determined based on the first coding tree structure in order to limit the scope of candidate coding units and hence reduce the computational complexity or reduce the coding unit structure side information overhead for determining the second coding tree structure.

In accordance with some examples of the present disclosure, when decoding an image frame, after determining a first coding tree structure for an image corresponding to a first color space component, such as a luma image of an original image, estimated constraints of a second coding tree structure for a counterpart image corresponding to a second color space component, such as a chroma image of the same original image, can be obtained based on the first coding tree structure in order to optimize the usage of the computational resources for decoding such the counterpart image or reduce the coding unit structure side information overhead when decoding information provided in the encoded video data regarding the second coding tree structure.

Figure 1:
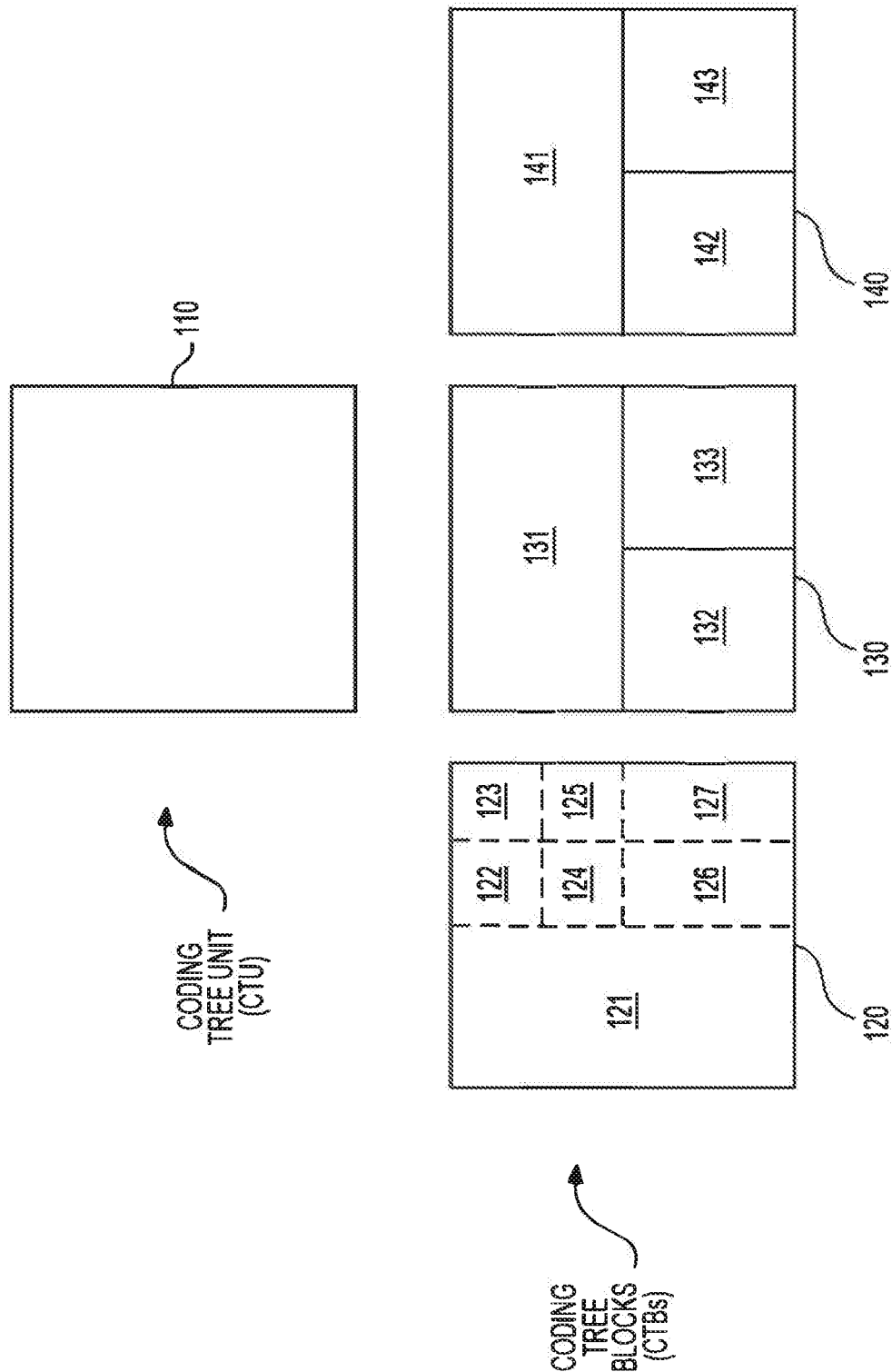
FIG. 1 shows a diagram illustrating a coding tree unit (CTU) and corresponding coding tree blocks (CTBs) according to an exemplary embodiment of the disclosure.

FIG. 1 shows a diagram illustrating a coding tree unit (CTU) 110 and corresponding coding tree blocks (CTBs) 120, 130, and 140 according to an exemplary embodiment of the disclosure. The CTU 110 may include an image block of an image frame that can be represented by various images corresponding to plural color space components of a predetermined color space. The predetermined color space may be an RBG, YUV, YCbCr, or YCoCg color space, or the like. For example, the image block of the CTU 110 may be represented using an YCbCr color space, which may include a luma component (Y), a blue-difference chroma component (Cb), and a red-difference chroma component (Cr). Accordingly, the CTU 110 may be divided into three CTBs 120, 130, and 140, where each CTB corresponds to a respective one of the color space components. For example, CTB 120 may correspond to the luma component, CTB 130 may correspond to the blue-difference chroma component, and CTB 140 may correspond to the red-difference chroma component. The image block coded by the CTU 110 (i.e., the original image of the CTU 110) can be a combination of three images, where each image is coded by a respective CTB and corresponds to a respective color space component.

Each CTB 120, 130, and 140 may be further divided into coding units (CUs). For example, CTB 120 may include coding units 121-127; CTB 130 may include coding units 131-133; and CTB 140 may include coding units 141-143. Each coding unit may include a prediction portion that can be coded using an intra or inter prediction process and a residual portion that is the difference between the image of the coding unit and the prediction portion. Also, depending on the chosen color format, the number of pixels in the CTB 120 may be different from the numbers of pixels in the CTB 130 or 140. The coding units of the CTB 120, CTB 130, and CTB 140 may be recorded using a quadtree (QT) partitioning structure or a quadtree plus binary tree (QTBT) partitioning structure. In one embodiment, the Cb and Cr can share a same coding unit tree structure. For example, the coding three structures in CTB 130 and CTB 140 are the same.

In the present disclosure, two coding units are collocated coding units when these two coding units correspond to at least one common pixel in an original image. A collocated coding unit in another CTB for a current coding unit of a current CTB can be identified by using a predetermined pixel position of the current coding unit. In some examples, the predetermined pixel position of the current coding unit can be the upper left corner pixel, a center pixel, any predetermined corner pixel, a pixel at a predetermined position, or the like. In the present disclosure, a first coding unit of a first color space is considered as corresponding to a second coding unit of a second color space when the first and second coding units are collocated coding units. Of course, the correspondence between a first coding unit of a first color space and a second coding unit of a second color space can be determined according to other applicable rules.

Figures 2A, 2B:
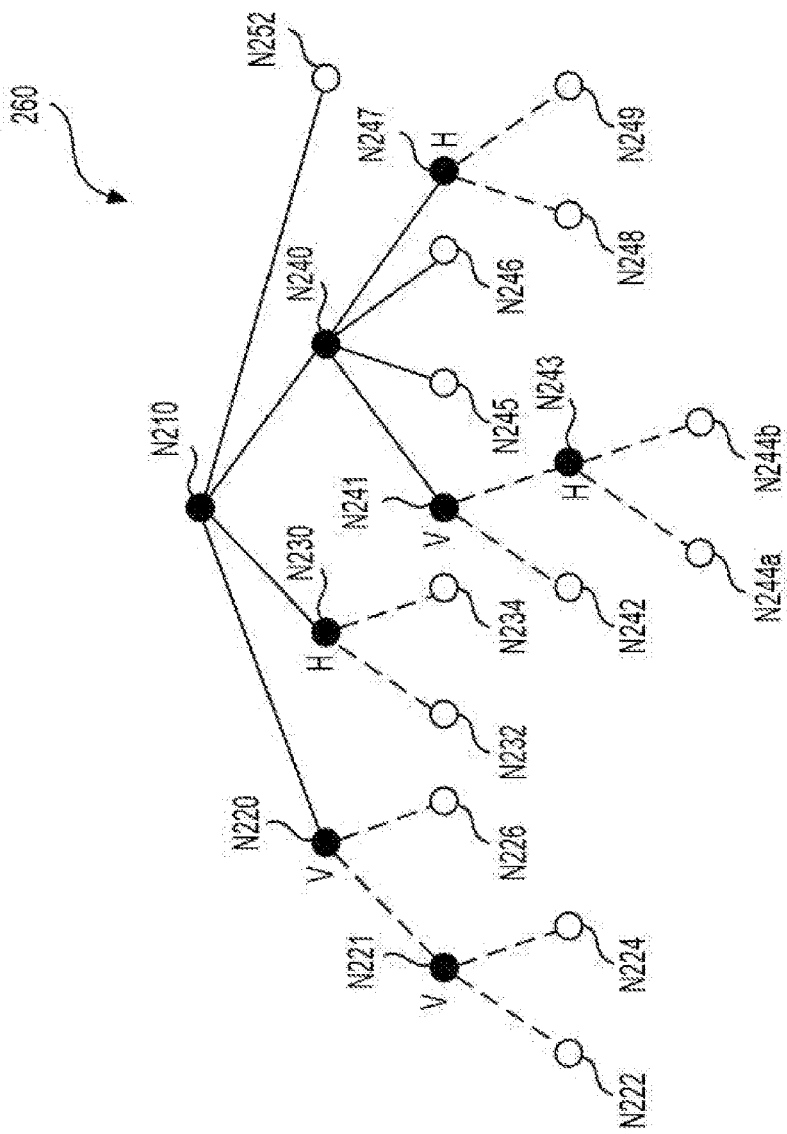
FIG. 2A shows an exemplary partitioning of an image of a CTB according to an embodiment of the disclosure.
FIG. 2B shows an exemplary coding tree structure of the CTB in FIG. 2A according to an embodiment of the disclosure.

FIG. 2A shows an exemplary petitioning of an image 210 of a CTB using QTBT partitioning structure according to an embodiment of the disclosure. The image and the CTB can correspond to a particular color space component, such as a luma component or a chroma component. The image 210 can be partitioned into various subdivisions 222, 224, 226, 232, 234, 242, 244a, 244b, 245, 246, 248, 249, and 252. Each one of the subdivisions 222, 224, 226, 232, 234, 242, 244a, 244b, 245, 246, 248, 249, and 252 correspond to a respective coding unit of the CTB.

FIG. 2B shows an exemplary coding tree structure 260 of the CTB in FIG. 2A according to an embodiment of the disclosure. The coding tree structure 260 is consistent with a QTBT partitioning structure and includes a root node N210 that corresponds to the entire image 210. Four branch nodes N220, N230, N240, and N252 extend from the root node N210, where node N252 is a leaf node where no further branch node extends therefrom and corresponds to the coding unit of subdivision 252. Node N220 corresponds to a subdivision or block of the image 210 that is the combination of subdivisions 222, 224, and 226. Two branch nodes N221 and N226 extend from the node N220 with an indicator V indicating that the corresponding subdivisions are partitioned along a vertical dividing line, where node N226 is a leaf node and corresponds to the coding unit of subdivision 226. Node N221 corresponds to a subdivision or block of the image 210 that is the combination of subdivisions 222 and 224. Two branch nodes N222 and N224 extend from the node N221 with an indicator V indicating that the corresponding subdivisions are partitioned along a vertical dividing line, where node N222 and node N224 are leaf nodes and correspond to the coding units of subdivisions 222 and 224, respectively. Node N230 corresponds to a subdivision or block of the image 210 that is the combination of subdivisions 232 and 234. Two branch nodes N232 and N234 extend from the node N230 with an indicator H indicating that the corresponding subdivisions are partitioned along a horizontal dividing line, where node N232 and node N234 are leaf nodes and correspond to the coding units of subdivisions 232 and 234, respectively.

Node N240 corresponds to a subdivision or block of the image 210 that is the combination of subdivisions 242-249. Four branch nodes N241, N245, N246, and N247 extend from the node N240, where node N245 and node N246 are leaf nodes and correspond to the coding units of subdivisions 245 and 246, respectively. Two branch nodes N242 and N243 extend from the node N241 with an indicator V indicating that the corresponding subdivisions are partitioned along a vertical dividing line, where node N242 is a leaf node and corresponds to the coding unit of subdivision 242. Two branch nodes N244a and N244b extend from the node N243 with an indicator H indicating that the corresponding subdivisions are partitioned along a horizontal dividing line, where node N244a and node N244b are leaf nodes and correspond to the coding units of subdivisions 244a and 244b, respectively. Also, two branch nodes N248 and N249 extend from the node N247 with an indicator H indicating that the corresponding subdivisions are partitioned along a horizontal dividing line, where node N248 and N249 are leaf nodes and correspond to the coding units of subdivisions 248 and 249, respectively.

In addition, when determining possible candidate coding units for encoding the CTB, each one of the subdivisions and various combinations of the subdivisions consistent with the QTBT partitioning structure can be candidate coding units.

Figure 3:
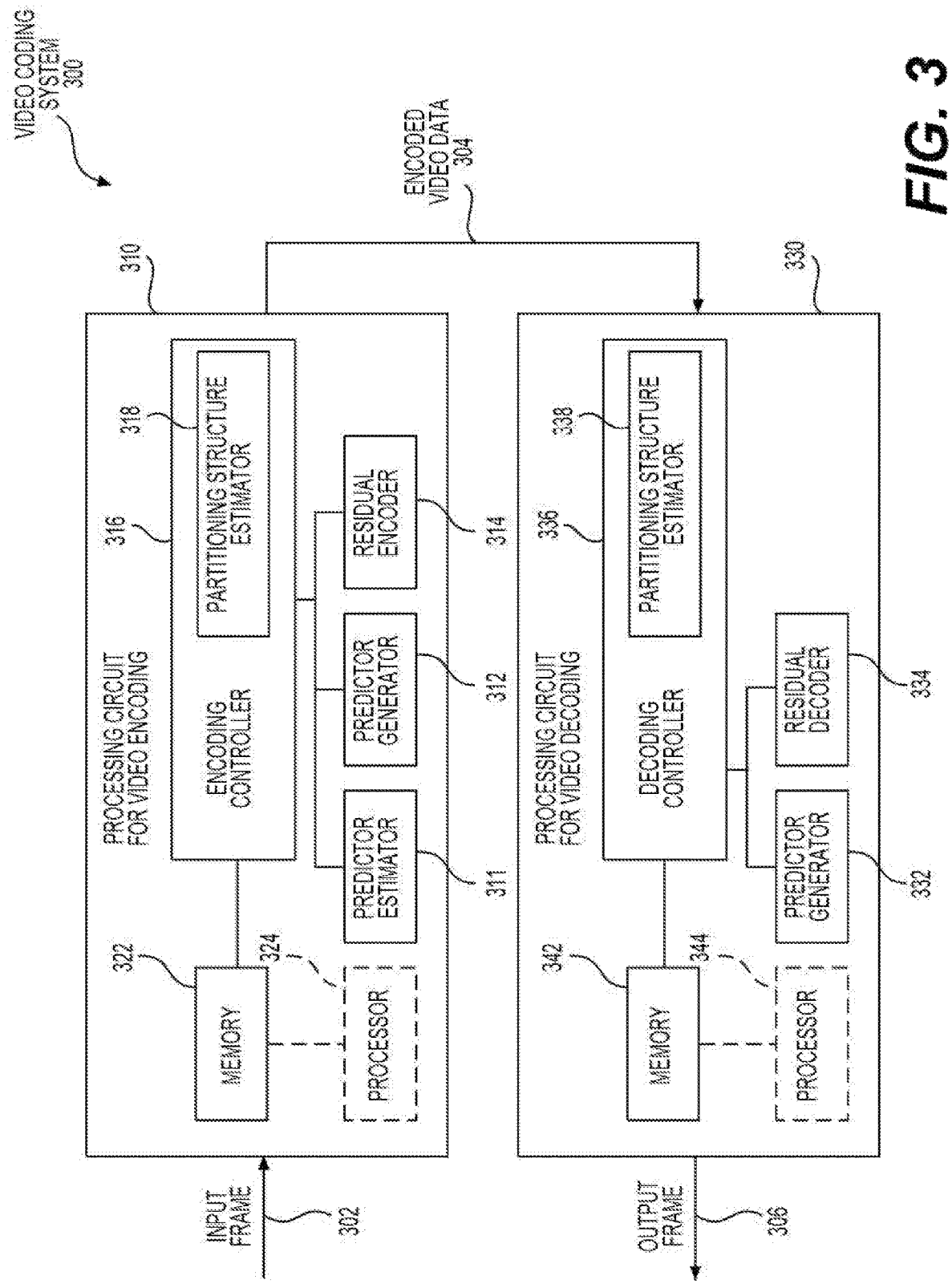
FIG. 3 shows an exemplary functional block diagram of a video coding system according to an embodiment of the disclosure.

FIG. 3 shows an exemplary functional block diagram of a video coding system 300 according to an embodiment of the disclosure. The video coding system 300 includes a processing circuit for video encoding (i.e., an encoding circuit) 310 and a processing circuit for video decoding (i.e., a decoding circuit) 330. The encoding circuit 310 receives an input frame 302 as input data and generates encoded video data 304 by encoding the input frame 302. The encoded video data 304 can be, for example, in a bitstream that includes data in a compressed format and can be stored in a non-transitory computer-readable medium. The decoding circuit 330 receives the encoded video data 304 as input data and generates output frame 306 by decoding the encoded video data 304. The video coding system 300 can be implemented by one or more video coding devices that can include the encoding circuit 310, the decoding circuit 330, or both the encoding circuit 310 and decoding circuit 330.

The encoding circuit 310 can include at least a predictor estimator 311, a predictor generator 312, a residual encoder 314, and an encoding controller 316. The encoding controller 316 further includes a partitioning structure estimator 318. The partitioning structure estimator 318 can analyze an input frame 302 and determine various approaches of dividing an image of a particular color space component into different combinations of candidate coding units.

The predictor estimator 311 can analyze a particular candidate coding unit and determine prediction information for encoding the candidate coding unit. The prediction information can specify a type of prediction, such as whether the candidate coding unit is to be encoded using intra prediction, inter prediction, or other applicable prediction mechanisms. The prediction information can also include prediction parameters for generating a prediction portion of the candidate coding unit using the specified prediction mechanism. The predictor generator 312 can generate the prediction portion of the candidate coding unit based on the prediction information provided by the predictor estimator 311. A residual portion of the candidate coding unit can be generated based on a difference between the prediction portion and a corresponding original image of the candidate coding unit. The residual encoder 314 can receive the residual portion and encode the residual portion into encoded residual data.

The encoding controller 316 can analyze the prediction information from the predictor estimator 311 and the encoded residual data from the residual encoder 314 and determine which combination of candidate coding units is to be used to encode the image of a particular color space component that is being processed. In some examples, information regarding whether a particular subdivision or block of the second image is splittable can be included in the final encoded video data 304. In some examples, such information regarding whether a block is splittable can be inferred by a decoder and thus can be omitted from the encoded video data 304 (that is, the encoder and the decoder use the same rule to determine whether a block is splittable). The encoding controller 316 can also oversee the encoding of the input frame 302, including the operations of the predictor estimator 311, predictor generator 312, and the residue encoder 314, and can generate the encoded video data 304 based on a determined partitioning structure for partitioning the image of a particular color space component into various coding units and the corresponding encoded information, such as the prediction information, the encoded residual data, and other encoding information, and/or controlling the operation of the predictor estimator 311, the predictor generator 312, and the residual encoder 314.

In operation, the partitioning structure estimator 318 can determine candidate coding units using a predetermined partitioning structure, such as a QT partitioning structure or a QTBT partitioning structure. In some examples, after a first partitioning structure for a first image that corresponds to a first color space component has been identified, the candidate coding units for a second image that corresponds to a second color space component can be determined by the partitioning structure estimator 318 based on the coding units of the first image. The first and second images can correspond to different color space components of a same original image. In some examples, for determining candidate coding units for partitioning the second image, a particular block of the second image can corresponding to a candidate coding unit, and whether splitting a particular block of the second image into branch candidate coding units of the particular candidate coding unit is invalid can be determined according to corresponding one or more of the first plurality of coding units.

For example, various sets of next-level branch candidate coding units of a particular block of the second image can be determined according to a predetermined partitioning structure. In some examples, for each branch candidate coding unit of a set of next-level branch candidate coding units of the particular block, the partitioning structure estimator 318 can identify a benchmark coding unit among the coding units of the first image that corresponds to the branch candidate coding unit, and determine whether a size of the branch candidate coding unit with respect to an original image is less than a size of the identified benchmark coding unit with respect to the original image. In some examples, the partitioning structure estimator 318 can determine that the set of next-level branch candidate coding units is invalid in a case that the size of one of the set of next-level branch candidate coding unit is less than the size of the corresponding benchmark coding unit, where the sizes are measurable with respect to the original image of the first and second images.

In one example, the size of a particular branch candidate coding unit of the second image can be determined based on an area of a first region in the original image that corresponds to the particular branch coding unit, and the size of a benchmark coding unit of the first image that corresponds to the particular branch candidate coding unit can be determined based on an area of a second region in the original image that corresponds to the benchmark coding unit. In another example, the size of a particular branch candidate coding unit of the second image can be determined based on a width or a height of a first region in the original image that corresponds to the particular branch coding unit, and the size of a benchmark coding unit of the first image that corresponds to the particular branch candidate coding unit can be determined based on a width or a height of a second region in the original image that corresponds to the coding unit.

In some examples, the partitioning structure estimator 318 can determine the candidate coding units for the second image in a manner that the candidate coding units for the second image match the coding units of the first image. In such examples, whether splitting a particular block of the second image into branch candidate coding units is invalid can be determined to be the same as a corresponding setting of a counterpart block of the first image. In some embodiments, the first coding tree structure for the first image that corresponds to the first color space component, such as a luma color space component, has a quadtree first partitioning structure (e.g. quadtree plus binary tree (QTBT) partitioning structure), and the second coding tree structure for the second image corresponding to the second color space component, such as a chroma color space component, having the quadtree first partitioning structure. In some examples, whether splitting a particular block of the second image into non-quadtree branch candidate (e.g. binary tree (BT) branch candidate) coding units is invalid is determined to be the same as a corresponding setting of a counterpart block of the first image when the first coding tree structure and the second coding tree structure have a same quadtree (QT) depth. For example, the proposed guided CU split can be only applied when the chroma CU and luma CU have the same QT depth, which means the chroma BT split follows luma BT split if their QT leaf-CUs are the same size. In some examples, the guided CU split is only applied for QT partition. Whether splitting the particular block of the second image into quadtree (QT) branch candidate coding units is invalid is determined according to a corresponding setting of a counterpart block of the first image. For example, the chroma QT split should follow luma QT split, while there is no constraint for BT split. If the luma QT is split, the chroma QT can be split or terminated (e.g. no further split or can be split into binary partition). If the luma QT is not split, the chroma QT cannot be split into QT partition (but can be split into binary partition). As such, in some examples, the chroma QT depth is not greater than the luma QT depth.

Examples regarding determining whether splitting a particular block of the second image into branch candidate coding units of the particular candidate coding unit is invalid will be further illustrated with reference to FIGS. 4A-4C.

The partitioning structure estimator 318 can determine a set of preliminary candidate coding units for partitioning the second image based on the coding tree structure of the first image as illustrated above, and further determine extension branch candidate coding units based on the set of preliminary candidate coding units. Therefore, the partitioning structure estimator 318 can obtain the plurality of candidate coding units for the second image by including the set of preliminary candidate coding units and the subsequently identified extension branch candidate coding units. For example, the partitioning structure estimator 318 can, for each leaf candidate coding unit of the set of preliminary candidate coding units that has not yet been divided into branch candidate coding units, identify extension branch candidate coding units of the leaf candidate coding unit. For example, the partitioning structure estimator 318 can, for a leaf candidate coding unit of the set of preliminary candidate coding units, identify extension branch candidate coding units that are not greater than a predetermined number of splitting level(s) from the leaf candidate coding unit. The splitting levels can be determined according to a predetermined partitioning structure.

Also, in another example, for each leaf candidate coding unit of the set of preliminary candidate coding units that has not yet been divided into branch candidate coding units, the partitioning structure estimator 318 can identify neighboring coding units of the second image. In some examples, the neighboring coding units are adjacent to the leaf candidate coding unit and are already confirmed to be part of the second plurality of coding units. In a case that a size of leaf candidate coding unit is greater than a corresponding size of the identified neighboring coding units, the partitioning structure estimator 318 can identify extension branch candidate coding units of the leaf candidate coding unit. In another case that a size of leaf candidate coding unit is greater than or equal to a corresponding size of the identified neighboring coding units, the partitioning structure estimator 318 can identify extension branch candidate coding units of the leaf candidate coding unit. The partitioning structure estimator 318 can, for a leaf candidate coding unit of the set of preliminary candidate coding units, identify extension branch candidate coding units that are not greater than a predetermined number of splitting level(s) from the leaf candidate coding unit. In some examples, the predetermined number can be set to one or two. Also, the splitting levels can be determined according to a predetermined partitioning structure.

Examples regarding identifying extension branch candidate coding units based on neighboring coding units will be further illustrated with reference to FIGS. 5A-5B.

The encoding circuit 310 can further include a memory 322 and a processor 324. The memory 322 can be used to store program instructions, information corresponding to the determined coding tree structures, the candidate coding units, the prediction modes, prediction parameters, input image frames, generated predictors, residual blocks, and/or intermediate data for performing various functions of the encoding circuit 310. In some examples, the memory 322 includes a non-transitory computer readable medium, such as a semiconductor or solid-state memory, a random access memory (RAM), a read-only memory (ROM), a hard disk, an optical disk, or other suitable storage medium. In some embodiments, the memory 322 includes a combination of two or more of the non-transitory computer readable mediums listed above.

The processor 324 is electrically coupled with the memory 322 and can be configured to execute the program instructions stored in the memory 322 to perform various functions. The processor 324 can include a single or multiple processing cores. Various components of the encoding circuit 310, such as the predictor estimator 311, the predictor generator 312, the residual encoder 314, and/or the encoding controller 316, can be implemented by hardware components, the processor 324 executing the program instructions, or a combination thereof. Of course, the processor 324 can also execute program instructions to control receiving of the input image frames 302 and the output of the encoded video data 304, in some examples, the processor 324 can execute the program instructions to perform functions that may not be directly related to encoding the input image frames 302.

Furthermore, as shown in FIG. 3, the decoding circuit 330 can include at least a predictor generator 332, a residual decoder 334, and a decoding controller 336. The decoding controller 336 further includes a partitioning structure estimator 338. The partitioning structure estimator 338 can analyze the encoded video data 304 while decoding a particular image frame (e.g., an output image frame 306) and determine an estimated partitioning tree structure for an image of a particular color space component. With such information, the decoding controller 336 may optimize the decoding process before actually or fully decoding the coding tree structure as provided in the encoded video data, or omit, in whole or in part, information provided in the encoded video data regarding the coding tree structure information.

The predictor generator 332 can generate a prediction portion of a coding unit in an image frame based on prediction information provided in the encoded video data 304. The prediction portion of the coding unit may be generated using intra prediction and/or inter prediction. The residue decoder 334 can generate a residual portion of the coding unit based on residual information provided in the encoded video data 304. The decoding controller 336 can oversee the decoding of the encoded video data 304, including estimating a coding tree structure of an image frame using the partitioning structure estimator 338, determining a coding tree structure of an image frame, determining prediction parameters based on the prediction information, providing the prediction parameters to the predictor generator 332, determining residual parameters based on the residual information, providing the residual parameters to the residual decoder 334, and/or controlling the operation of the partitioning structure estimator 338, the predictor generator 332, and/or the residual decoder 334.

In operation, the decoding controller 336 may receive the encoded video data 304, including information of an image frame to be decoded by the decoding circuit 330. The partitioning structure estimator 338 can analyze the encoded video data 304 and estimate constraints with respect to decoding a partitioning tree structure for an image of a particular color space component in a manner as described with reference to the partitioning structure estimator 318. The decoding controller 336 can use the estimated constraints to increase the efficiency in determining an actual partitioning tree structure for the image of the particular color space component or reduce the coding unit structure side information overhead when decoding information provided in the encoded video data 304 regarding the coding tree structure.

For example, in operation, the partitioning structure estimator 338 can analyze the second image by dividing the second image into various blocks at different splitting level according to a predetermined partitioning structure, such as a QT partitioning structure or a QTBT partitioning structure. In some examples, after a first partitioning structure for a first image that corresponds to a first color space component has been identified, a second partitioning structure for partitioning the second image into a second plurality of coding units can be determined by the partitioning structure estimator 338 based on the coding units of the first image. The first and second images can correspond to different color space components of a same encoded image. In some examples, for determining the second partitioning structure for partitioning the second image, whether splitting a particular block of the second image into branch candidate coding units of the particular candidate coding unit is invalid can be determined according to corresponding one or more of the first plurality of coding units.

For example, various sets of next-level branch candidate coding units of a particular block of the second image can be determined according to a predetermined partitioning structure. In some examples, for each branch candidate coding unit of a set of next-level branch candidate coding units of the particular block, the partitioning structure estimator 338 can identify a benchmark coding unit among the coding units of the first image that corresponds to the branch candidate coding unit, and determine whether a size of the branch candidate coding unit with respect to an encoded image is less than a size of the identified benchmark coding unit with respect to the encoded image. In some examples, the partitioning structure estimator 338 can determine that the set of next-level branch candidate coding units is invalid in a case that the size of one of the set of next-level branch candidate coding unit is less than the size of the corresponding benchmark coding unit, where the sizes are measurable with respect to the encoded image of the first and second images.

In one example, the size of a particular branch candidate coding unit of the second image can be determined based on an area of a first region in the encoded image that corresponds to the particular branch coding unit, and the size of a benchmark coding unit of the first image that corresponds to the particular branch candidate coding unit can be determined based on an area of a second region in the encoded image that corresponds to the benchmark coding unit. In another example, the size of a particular branch candidate coding unit of the second image can be determined based on a width or a height of a first region in the encoded image that corresponds to the particular branch coding unit, and the size of a benchmark coding unit of the first image that corresponds to the particular branch candidate coding unit can be determined based on a width or a height of a second region in the encoded image that corresponds to the coding unit.

In some examples, whether splitting a particular block of the second image into branch candidate coding units is invalid can be determined to be the same as a corresponding setting of a counterpart block of the first image. In some embodiments, the first coding tree structure for the first image that corresponds to the first color space component, such as a luma color space component, has a quadtree first partitioning structure (e.g. quadtree plus binary tree (QTBT) partitioning structure), and the second coding tree structure for the second image corresponding to the second color space component, such as a chroma color space component, having the quadtree first partitioning structure. In some examples, whether splitting a particular block of the second image into non-quadtree branch candidate (e.g. binary tree (BT) branch candidate) coding units is invalid is determined to be the same as a corresponding setting of a counterpart block of the first image when the first coding tree structure and the second coding tree structure have a same quadtree (QT) depth. For example, the proposed guided CU split can be only applied when the chroma CU and luma CU have the same QT depth, which means the chroma BT split follows luma BT split if their QT leaf-CUs are the same size. In some examples, the guided CU split is only applied for QT partition. Whether splitting the particular block of the second image into quadtree (QT) branch candidate coding units is invalid is determined according to a corresponding setting of a counterpart block of the first image. For example, the chroma QT split should follow luma QT split, while there is no constraint for BT split. If the luma QT is split, the chroma QT can be split or terminated (e.g. no further split or can be split into binary partition). If the luma QT is not split, the chroma QT cannot be split into QT partition (but can be split into binary partition). As such, in some examples, the chroma QT depth is not greater than the luma QT depth.

In some examples, the partitioning structure estimator 338 can first check if a particular block has been determined to be splittable and can skip determining whether splitting the particular block of the second image into branch candidate coding units is invalid. Otherwise, in a case that splitting the particular block of the second image into branch candidate coding units is determined to be invalid according to a size of the particular block of the second image and a size of a corresponding one of the first plurality of coding units, the partitioning structure estimator 338 can determine candidate subdivisions of the particular block that are not greater than a predetermined number of splitting level(s) from the particular block as valid. The splitting levels can be determined according to a predetermined partitioning structure. In some examples, the predetermined number is one or two.

In some examples, the partitioning structure estimator 338 can identify neighboring coding units of the particular block of the second image, where the neighboring coding units are adjacent to the particular block. In a case that a size of the particular block is greater than, or greater than or equal to, a corresponding size of the identified neighboring coding units, the partitioning structure estimator 338 can determine that splitting the particular block of the second image into branch candidate coding units is valid. In some examples, in a case that splitting the particular block of the second image into branch candidate coding units is determined to be invalid according to a size of the particular block of the second image and the corresponding size of the identified neighboring coding units, the partitioning structure estimator 338 can determine candidate subdivisions of the particular block that are not greater than a predetermined number of splitting level(s) from the particular block as valid.

Accordingly, the decoding controller 336 can determine whether to process a particular block by extracting a coding unit corresponding to the block or extracting information regarding various blocks that are next-level subdivisions of the particular block.

Moreover, after identifying a coding unit, the decoding controller 336 can extract from the encoded video data 304 the prediction information, including a prediction type and corresponding prediction parameters, for generating the prediction portion of the coding unit. The decoding controller 336 can extract from the encoded video data 304 coded residual data for generating the residual portion of the coding unit. The predictor generator 332 can generate the prediction portion of the current block based on the prediction information provided by the decoding controller 336. The residual decoder 334 can generate the residual portion of the current block based on the encoded residual data provide by the decoding controller 336. Finally, the decoding controller 336 can generate the output image frame 306 based on the decoded coding unit, which is generated based on the generated prediction portion and the reconstructed residual portion of the coding unit.

The decoding circuit 330 can further include a memory 342 and a processor 344. The memory 342 can be used to store program instructions, information corresponding to the estimated constraints for determining coding tree structures, the actual coding tree structures, the candidate coding units, the prediction modes, prediction parameters, encoded video data, reconstructed frames, generated predictors, reconstructed residual portions, and/or intermediate data for performing various functions of the decoding circuit 330. In some examples, the memory 342 includes a non-transitory computer readable medium, such as a semiconductor or solid-state memory, a random access memory (RAM), a read-only memory (ROM), a hard disk, an optical disk, or other suitable storage medium. In some embodiments, the memory 342 includes a combination of two or more of the non-transitory computer readable mediums listed above.

The processor 344 is electrically coupled with the memory 342 and can be configured to execute the program instructions stored in the memory 342 to perform various functions. The processor 344 can include a single or multiple processing cores. Various components of the decoding circuit 330, such as the predictor generator 332, the residual decoder 334, and/or the decoding controller 336, can be implemented by hardware components, the processor 344 executing the program instructions, or a combination thereof. Of course, the processor 344 can also execute program instructions to control receiving of the encoded video data 304 and the output of the output image frames 306. In some examples, the processor 344 can execute the program instructions to perform functions that may not be directly related to decoding the encoded video data 304.

Furthermore, the encoding circuit 310 and the decoding circuit 330 can be implemented in the same electronic device, and various components of the encoding circuit 310 and the decoding circuit 330 can be shared or reused. For example, one or more of the memory 322, processor 324, predictor generator 312, and the estimated coding tree structures 318 in the encoding circuit 310 can also be used to function as the memory 342, processor 344, predictor generator 332, and the estimated coding tree structures 338 in the decoding circuit 330, respectively.

Figure 4A:
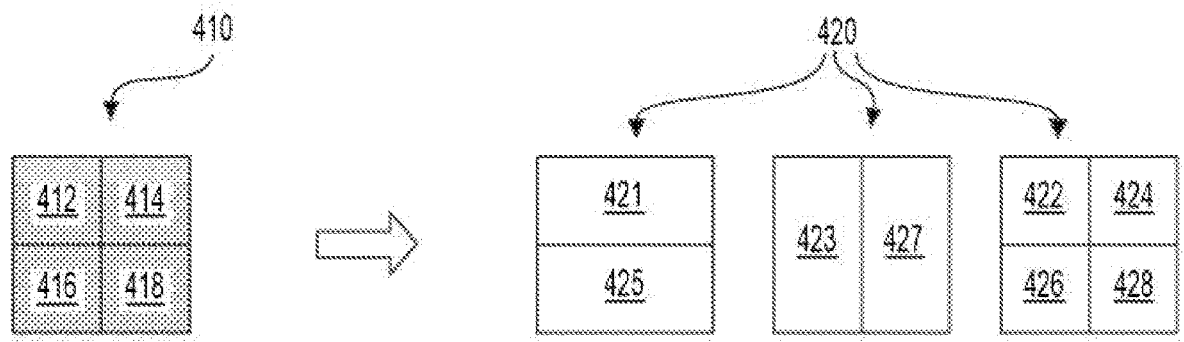
FIGS. 4A-4C show exemplary constraints for determining validity of branch candidate coding units for an image corresponding to a color component based on coding units of a counterpart image of a same original or encoded image corresponding to another color component according to an embodiment of the disclosure.

FIG. 4A shows a first exemplary set of constraints for determining validity of branch candidate coding units for an image corresponding to a color component based on coding units of a counterpart image of the same original or encoded image corresponding to another color component according to an embodiment of the disclosure. In FIG. 4A, a portion 410 of a first image corresponding to a first color component is evenly divided into four coding units 412-418. A subdivision or block 420 of a second image corresponding to a second color component, which correspond to a same region in an original or encoded image as the portion 410 of the first image, can be divided into three sets of branch candidate coding units: (i) two branch candidate coding units 421 and 425 along a horizontal dividing line; (ii) two branch candidate coding units 423 and 427 along a vertical dividing line; or (iii) four branch candidate coding units 422, 424, 426, and 428 along both a horizontal divining line and a vertical dividing line.

In some examples, the subdivision or block 420 and the portion 410 do not have to correspond to exactly the same portion in the original or encoded image. Also, in various embodiments described in this disclosure, the comparison of the areas, lengths, and/or widths by the partitioning structure estimator 318/338 is based on the areas, lengths, and/or widths as measured with respect to the original or encoded image.

In some examples, the partitioning structure estimator 318/338 can determine whether each of the branch candidate coding units is valid based on a size of the branch candidate coding unit and a size of the corresponding benchmark coding unit in the portion 410 of the first image. In some examples, two coding units are considered as corresponding coding units when the upper-left corner of these two coding units can be mapped to the same pixel in an original or encoded image. Therefore, the coding unit 412 corresponds to the branch candidate coding unit 421, and the coding unit 416 corresponds to the branch candidate coding unit 425.

In one example, the partitioning structure estimator 318/338 can determine that both branch candidate coding units 421 and 425 are valid, because an area of the branch candidate coding unit 421 or 425 is not less than an area of the corresponding coding unit 412 or 416. In another example, the partitioning structure estimator 318/338 can determine that both branch candidate coding units 421 and 425 are valid, because a length or a width of the branch candidate coding unit 421 or 425 is not less than a length or a width of the corresponding coding unit 412 or 416.

However, in yet another example, the partitioning structure estimator 318/338 can determine that both branch candidate coding units 421 and 425 are invalid, because the branch candidate coding unit 421 or 425 does not match the corresponding coding unit 412 or 416.

With respect to the set of branch candidate coding units 423 and 427, the corresponding coding units could be coding units 412 and 414. In one example, the partitioning structure estimator 318/338 can determine that both branch candidate coding units 423 and 427 are valid, because an area of the branch candidate coding unit 423 and 427 is not less than an area of the corresponding coding unit 412 or 414. In another example, the partitioning structure estimator 318/338 can determine that both branch candidate coding units 423 and 427 are valid, because a length or a width of the branch candidate coding unit 423 and 427 is not less than a length or a width of the corresponding coding unit 412 or 414. Of course, in yet another example, the partitioning structure estimator 318/338 can determine that both branch candidate coding units 423 and 427 are invalid, because the branch candidate coding unit 421 or 425 does not match the corresponding coding unit 412 or 414.

With respect to the set of branch candidate coding units 422, 424, 426, and 428, the corresponding coding units could be coding units 412, 414, 416, and 418, respectively. In some examples, the partitioning structure estimator 318/338 can determine that all branch candidate coding units 422, 424, 426, and 428 are valid, as such subdivisions would also pass the tests based on comparing the area, the length/width, or the matching coding units.

Figure 4B:
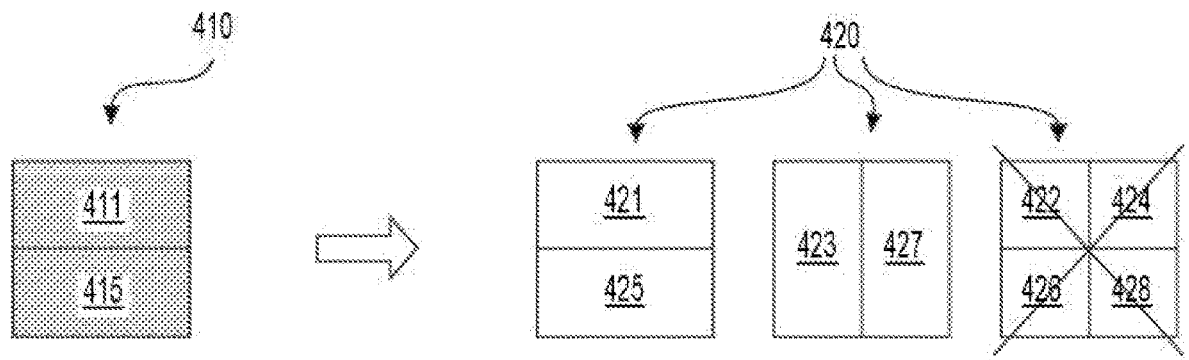

FIG. 4B shows a second exemplary set of constraints for determining validity of branch candidate coding units for an image corresponding to a color component based on coding units of a counterpart image of the same image frame corresponding to another color component according to an embodiment of the disclosure. In FIG. 4B, the portion 410 of the first image is divided along a horizontal dividing line into two coding units 411 and 415.

With respect to the set of branch candidate coding units 421 and 425, the corresponding coding units could be coding units 411 and 415. In one example, the partitioning structure estimator 318/338 can determine that both branch candidate coding units 421 and 425 are valid, because an area of the branch candidate coding unit 421 and 425 is not less than an area of the corresponding coding unit 411 or 415. In another example, the partitioning structure estimator 318/338 can determine that both branch candidate coding units 421 and 425 are valid, because a length or a width of the branch candidate coding unit 421 and 425 is not less than a length or a width of the corresponding coding unit 411 or 415. In yet another example, the partitioning structure estimator 318/338 can determine that both branch candidate coding units 421 and 425 are valid, because the branch candidate coding units 421 and 425 match the corresponding coding units 411 and 415.

With respect to the set of branch candidate coding units 423 and 427, the corresponding coding units could be coding unit 411 for both branch candidate units. In one example, the partitioning structure estimator 318/338 can determine that both branch candidate coding units 423 and 427 are valid, because an area of the branch candidate coding unit 423 and 427 is not less than an area of the corresponding coding unit 411. In another example, the partitioning structure estimator 318/338 can determine that both branch candidate coding units 423 and 427 are invalid, because a width of the branch candidate coding unit 423 and 427 is less than a width of the corresponding coding unit 411. In yet another example, the partitioning structure estimator 318/338 can determine that both branch candidate coding units 423 and 427 are invalid as failing to match the corresponding coding unit 411.

Moreover, with respect to the set of branch candidate coding units 422, 424, 426, and 428, the corresponding coding unit for branch candidate coding units 422 and 424 could be coding unit 411, and the corresponding coding unit for branch candidate coding units 426 and 428 could be coding unit 415. In some examples, the partitioning structure estimator 318/338 can determine that all branch candidate coding units 422, 424, 426, and 428 are invalid, as such subdivisions would fail any of the tests based on comparing the area, the length/width, or the matching coding units.

Figure 4C:
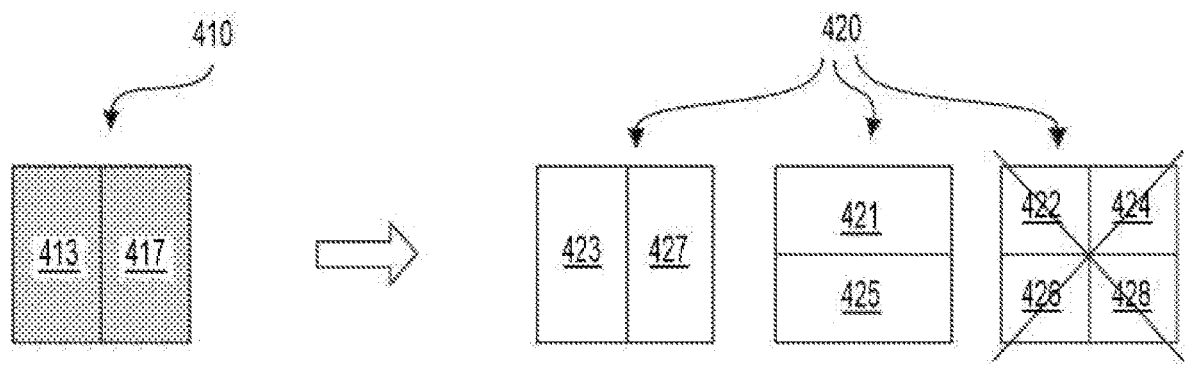

FIG. 4C shows a third exemplary set of constraints for determining validity of branch candidate coding units for an image corresponding to a color component based on coding units of a counterpart image of the same image frame corresponding to another color component according to an embodiment of the disclosure. In FIG. 4C, the portion 410 of the first image is divided along a vertical dividing line into two coding units 413 and 417.

With respect to the set of branch candidate coding units 423 and 427, the corresponding coding units could be coding units 413 and 417, respectively. In one example, the partitioning structure estimator 318/338 can determine that both branch candidate coding units 423 and 427 are valid, because an area of the branch candidate coding unit 423 and 427 is not less than an area of the corresponding coding unit 413 and 417. In another example, the partitioning structure estimator 318/338 can determine that both branch candidate coding units 423 and 427 are valid, because a length or a width of the branch candidate coding unit 423 and 427 is not less than a length or a width of the corresponding coding unit 413 or 417. In yet another example, the partitioning structure estimator 318/338 can determine that both branch candidate coding units 423 and 427 are valid, because the branch candidate coding units 423 and 427 match the corresponding coding units 413 and 417.

With respect to the set of branch candidate coding units 421 and 425, the corresponding coding units could be coding unit 413 for both branch candidate units. In one example, the partitioning structure estimator 318/338 can determine that both branch candidate coding units 423 and 427 are valid, because an area of the branch candidate coding unit 421 and 425 is not less than an area of the corresponding coding unit 413. In another example, the partitioning structure estimator 318/338 can determine that both branch candidate coding units 421 and 425 are invalid, because a length of the branch candidate coding unit 421 or 425 is less than a length of the corresponding coding unit 413. In yet another example, the partitioning structure estimator 318/338 can determine that both branch candidate coding units 421 and 425 are invalid as failing to match the corresponding coding unit 413.

Moreover, with respect to the set of branch candidate coding units 422, 424, 426, and 428, the corresponding coding unit for branch candidate coding units 422 and 426 could be coding unit 413, and the corresponding coding unit for branch candidate coding units 424 and 428 could be coding unit 417. In some examples, the partitioning structure estimator 318/338 can determine that all branch candidate coding units 422, 424, 426, and 428 are invalid, as such subdivisions would fail any of the tests based on comparing the area, the length/width, or the matching coding units.

Figure 5B:
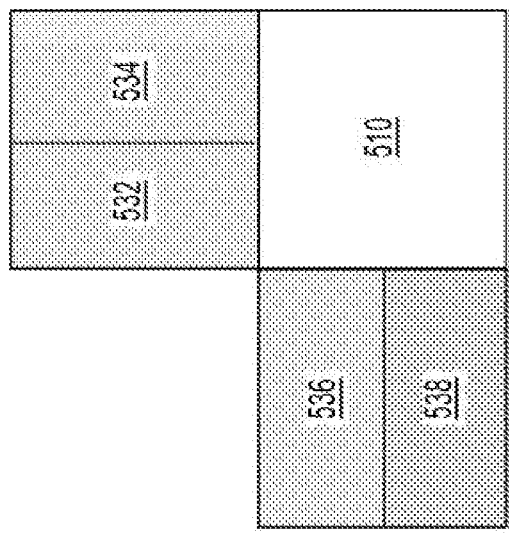
FIGS. 5A-5B show exemplary constraints for determining extension branch candidate coding units for an image corresponding to a color component based on neighboring coding units of the image according to an embodiment of the disclosure.
Figure 5A:
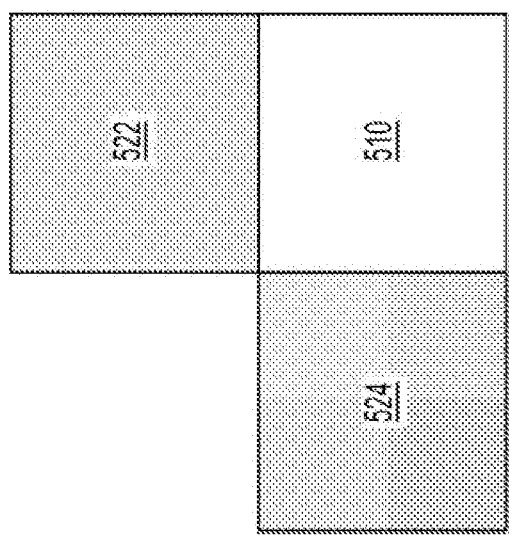

FIG. 5A and FIG. 5B show exemplary constraints for determining extension branch candidate coding units for an image corresponding to a color component based on neighboring coding units of the image according to an embodiment of the disclosure. In FIG. 5A, a subdivision or block 510 of an image corresponding to a particular color component has a neighboring coding unit 522 adjacent to an upper edge of the block 510 and a neighboring coding unit 524 adjacent to a left edge of the block 510. In FIG. 5B, the block 510 has two neighboring coding units 532 and 534 adjacent to the upper edge of the block 510 and two neighboring coding units 536 and 538 adjacent to the left edge of the block 510.

In an embodiment of the disclosure, if an area, a length, and/or a width of the block 510 is greater than or equal to those of the neighboring coding units, the extension branch candidate coding units of the candidate coding unit is valid. For example, the partitioning structure estimator 318/338 can identify the neighboring coding units 522 and 524, or the neighboring coding units 532-538, and determine whether the block 510 is allowed to be further divided into extension branch candidate coding units based on the sizes of the neighboring coding units 522 and 524, or the neighboring coding units 532-538, and a size of the block 510. For example, because an area, a length, and/or a width of the block 510 is greater than or equal to those of the neighboring coding units 522 and 524, and the neighboring coding units 532-538, the partitioning structure estimator 318/338 can determine that extension branch candidate coding units of the block 510 is valid.

In another embodiment of the disclosure, if an area, a length, and/or a width of the block 510 is greater than those of the neighboring coding units, the extension branch candidate coding units of the candidate coding unit is valid; otherwise, the extension branch candidate coding units of the block 510 is invalid. For example, the partitioning structure estimator 318/338 can identify the neighboring coding units 522 and 524, and determine whether the block 510 is allowed to be further divided into extension branch candidate coding units based on the sizes of the neighboring coding units 522 and 524, and a size of the block 510. For example, because an area, a length, and/or a width of the block 510 is not greater than those of the neighboring coding units 522 and 524, the partitioning structure estimator 318/338 can determine that extension branch candidate coding units of the candidate coding unit 510 is invalid. The partitioning structure estimator 318/338 can identify the neighboring coding units 532-538, and determine whether the block 510 is allowed to be further divided into extension branch candidate coding units based on the sizes of the neighboring coding units 532-538, and a size of the block 510. For example, because an area, a length, and/or a width of the block 510 is greater than those of the neighboring coding units 532-538, the partitioning structure estimator 318/338 can determine that extension branch candidate coding units of the block 510 is valid.

In some examples, the partitioning structure estimator 318/338 can determine candidate subdivisions of the particular block that are not greater than a predetermined number of splitting level(s) from the particular block as valid. In some examples, the predetermined number of splitting levels can be one or two, or any other suitable number.

Figure 6A:
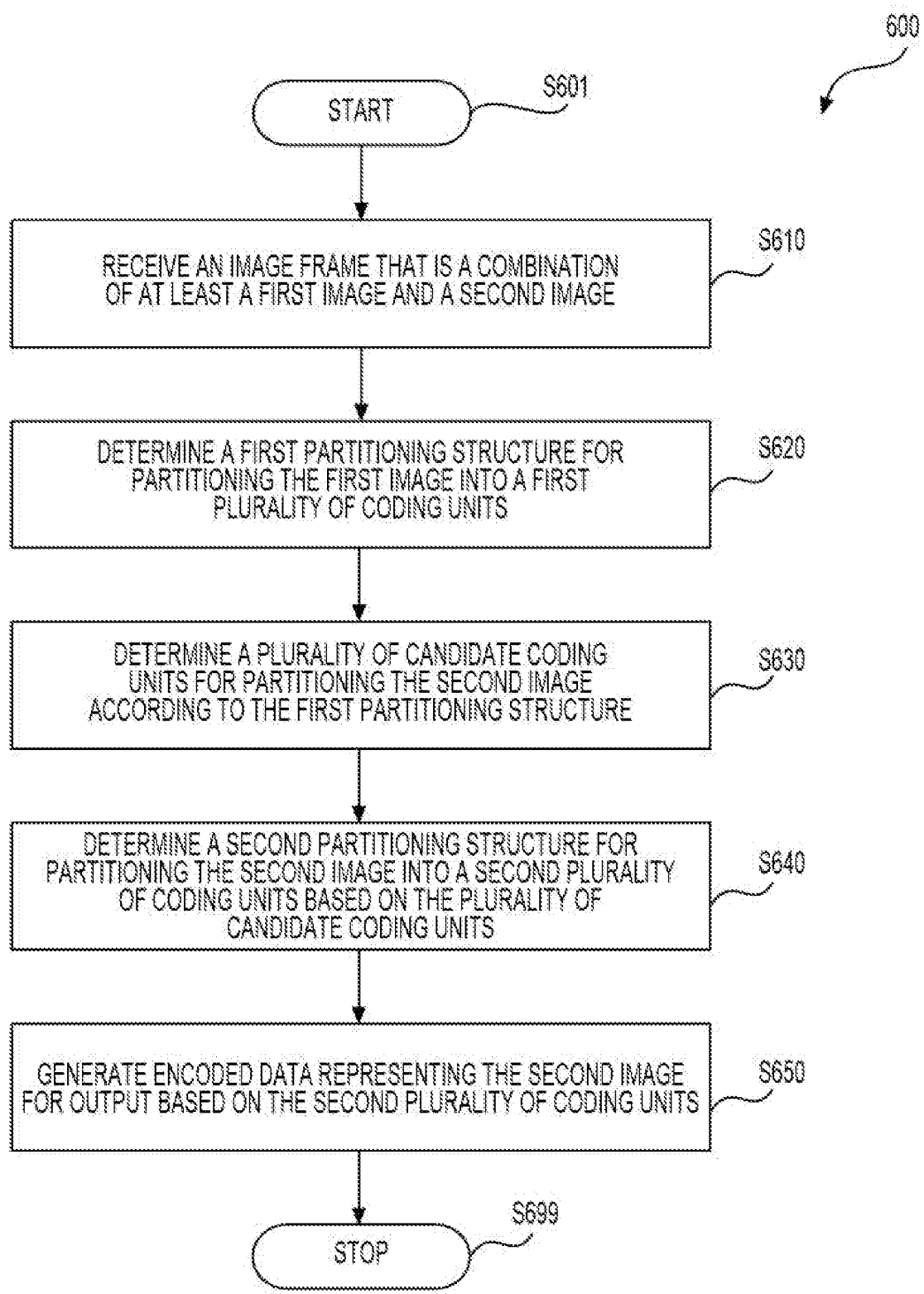
FIG. 6A shows a flow chart outlining an exemplary encoding process using a processing circuit, such as the processing circuit for video encoding in FIG. 3, according to an embodiment of the disclosure.

FIG. 6A shows a flow chart outlining an exemplary encoding process 600 using a processing circuit, such as the processing circuit 310 for video encoding in FIG. 3, according to an embodiment of the disclosure. It is understood that additional operations may be performed before, during, and/or after the process 600 depicted in FIG. 6A. The process 600 starts at S601 and proceeds to S610.

At S610, an image frame that includes an original image, which is a combination of at least a first image and a second image is received, where the first and second images correspond to different color space components of the original image of the image frame. For example, the encoding controller 316 can receive the input image frames 302 that include a first image and a second image of a same original image of an image frame. In some examples, the first image corresponds to a luma color space component, and the second image corresponds to a chroma color space component. In yet some examples, the first image corresponds to a first color space component that is to be encoded at a higher spatial resolution, and the second image corresponds to a second color space component that is to be encoded at a lower spatial resolution than that for the first color space component.

At S620, a first partitioning structure for partitioning the first image into a first plurality of coding units is determined. In some examples, the first partitioning structure can be determined based on first identifying various possible combination of subdivisions and corresponding candidate coding units of the first image according to a predetermined partitioning structure, encoding the candidate coding units, and selecting a combination of candidate coding units as final coding units that would comply a set of predetermined coding criteria, and recoding the partitioning of the first image in the first partitioning structure based on how the first image is to be partitioned into the final coding units and the predetermined partitioning structure.

For example, the encoding controller 316, using the partitioning structure estimator 318, can determine candidate coding units and test various coding schemes using the predictor estimator 311, the predictor generator 312, and the residual encoder 314. The finally identified coding units are also recorded in a first partitioning structure of the first image and can be stored in the memory 322.

At S630, a plurality of candidate coding units for partitioning the second image is determined according to the first partitioning structure for partitioning the first image. The candidate coding units for partitioning the second image can be determined with constraints determined based on the first partitioning structure for partitioning the first image. For example, whether further dividing a particular block of the second image into branch candidate coding units is invalid can be determined based on comparing a size of branch candidate coding units and corresponding benchmark coding units among the first plurality of coding units of the first image.

For example, the encoding controller 316, using the partitioning structure estimator 318, can determine candidate coding units for the second image based on the constraints as described with reference to FIGS. 3, 4A-4B, and/or FIGS. 5A-5B.

In some examples, for each branch candidate coding unit of a proposed set of next-level branch candidate coding units of a particular block of the second image, a benchmark coding unit among the first plurality of coding units that corresponds to the branch candidate coding unit can be identified, and whether a size of the branch candidate coding unit with respect to the original image is less than a size of the coding unit that corresponds to the branch candidate coding unit with respect to the original image can be determined. The set of next-level branch candidate coding units can be determined as invalid in a case that the size of one of the set of next-level branch candidate coding units with respect to the original image is less than the size of the coding unit that corresponds to the one of the set of next-level branch candidate coding units with respect to the original image.

In one example, the size of a particular branch candidate coding unit of the second image can be determined based on an area of a first region in the original image that corresponds to the particular branch coding unit, and the size of a coding unit of the first image that corresponds to the particular branch candidate coding unit can be determined based on an area of a second region in the original image that corresponds to the coding unit. In another example, the size of a particular branch candidate coding unit of the second image can be determined based on a width or a height of a first region in the original image that corresponds to the particular branch coding unit, and the size of a coding unit of the first image that corresponds to the particular branch candidate coding unit can be determined based on a width or a height of a second region in the original image that corresponds to the coding unit.

Of course, in at least on example, the candidate coding units that match the first plurality of coding units of the first image are determined to be candidate coding units of the second image. In such scenario, whether splitting the particular block of the second image into branch candidate coding units is invalid can be determined to be the same as a corresponding setting of a counterpart block of the first image. In some embodiments, the first coding tree structure for the first image that corresponds to the first color space component, such as a luma color space component, has a quadtree first partitioning structure (e.g. quadtree plus binary tree (QTBT) partitioning structure), and the second coding tree structure for the second image corresponding to the second color space component, such as a chroma color space component, having the quadtree first partitioning structure. In some examples, whether splitting a particular block of the second image into non-quadtree branch candidate (e.g. binary tree (BT) branch candidate) coding units is invalid is determined to be the same as a corresponding setting of a counterpart block of the first image when the first coding tree structure and the second coding tree structure have a same quadtree (QT) depth. For example, the proposed guided CU split can be only applied when the chroma CU and luma CU have the same QT depth, which means the chroma BT split follows luma BT split if their QT leaf-CUs are the same size. In some examples, the guided CU split is only applied for QT partition. Whether splitting the particular block of the second image into quadtree (QT) branch candidate coding units is invalid is determined according to a corresponding setting of a counterpart block of the first image. For example, the chroma QT split should follow luma QT split, while there is no constraint for BT split. If the luma QT is split, the chroma QT can be split or terminated (e.g. no further split or can be split into binary partition). If the luma QT is not split, the chroma QT cannot be split into QT partition (but can be split into binary partition). As such, in some examples, the chroma QT depth is not greater than the luma QT depth.

In some examples, at S630, a set of preliminary candidate coding units is determined based on the first partitioning structure for partitioning the first image, and additional extension branch candidate coding units can be identified according to a predetermined rule. An exemplary implementation of S630 will be illustrated with reference to FIG. 6B. Also, an exemplary implementation of determining whether a set of next-level branch candidate coding units is valid will be illustrated with reference to FIG. 7.

At S640, a second partitioning structure for partitioning the second image into a second plurality of coding units is determined based on the plurality of candidate coding units from S630. In some examples, the second partitioning structure can be determined based on encoding the candidate coding units and selecting a combination of candidate coding units as final coding units that would meet a set of predetermined coding criteria, and recoding the partitioning of the second image in the second partitioning structure based on how the second image is to be partitioned into the final coding units.

For example, the encoding controller 316, using the partitioning structure estimator 318, can test various coding schemes based on the candidate coding units determined at S630 using the predictor estimator 311, the predictor generator 312, and the residual encoder 314. The result of the finally identified second partitioning structure can be stored in the memory 322.

At S650, the current image frame is encoded, including generating encoded data that represent the first image for output based on the first plurality of coding units and generating encoded data that represent the second image for output based on the second plurality of coding units. For example, the encoding controller 316 and can encode the first and second images based on the corresponding partitioning structures and coding units.

After S650, the process proceeds to S699 and terminates.

Figure 6B:
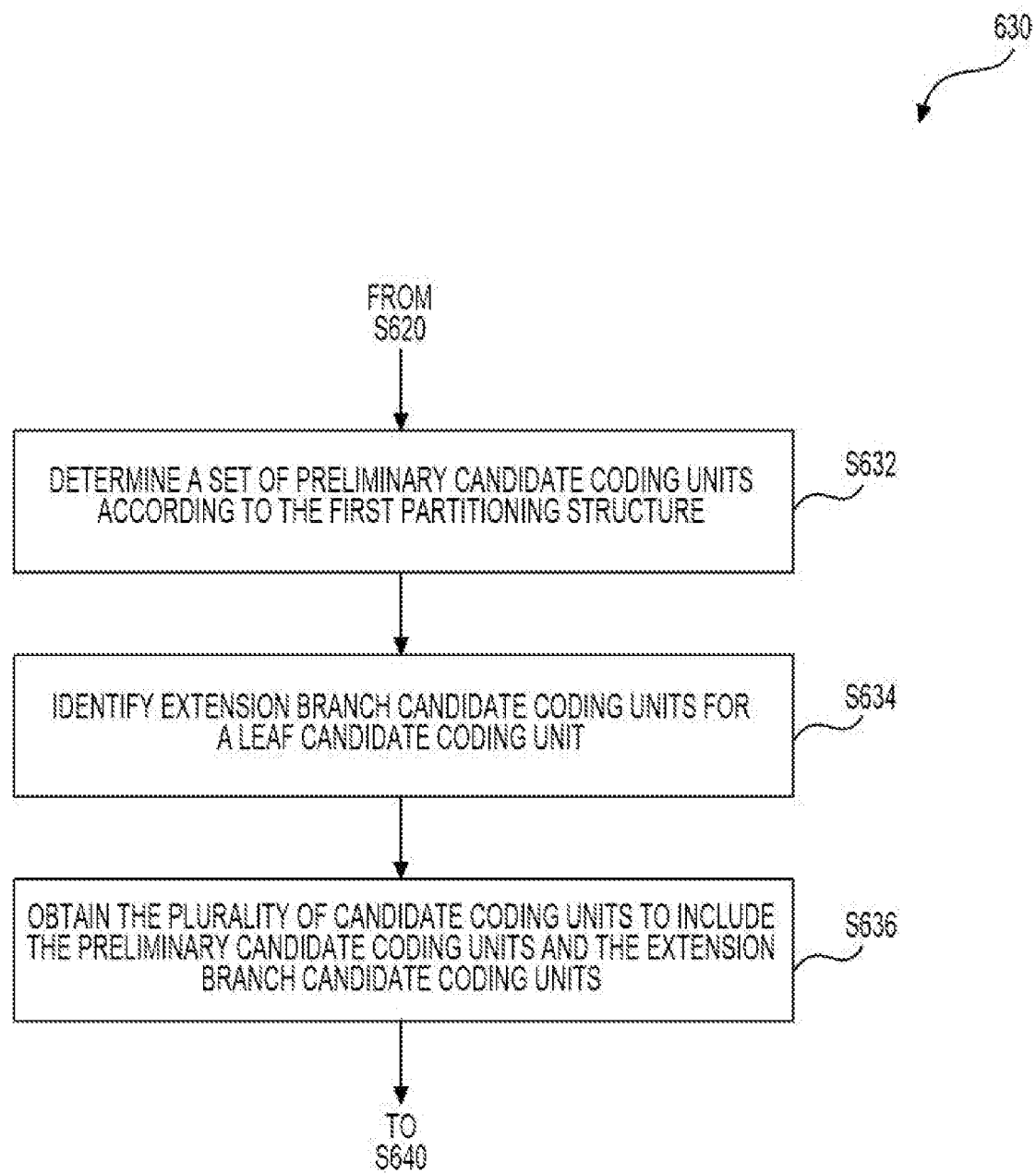
FIG. 6B shows a flow chart outlining exemplary operations for determining a partitioning structure, such as S630 in FIG. 6A, according to an embodiment of the disclosure.

FIG. 6B shows a flow chart outlining exemplary operations 630 for determining a partitioning structure, such as S630 in FIG. 6A, according to an embodiment of the disclosure. It is understood that additional operations can be performed before, during, and/or after the process 630 depicted in FIG. 6B. The process 630 can be performed by the encoding controller 316 using the partitioning structure estimator 318.

After S620, the process 630 proceeds to S632, where a set of preliminary candidate coding units can be determined according to the first partitioning structure. For example, the set of preliminary candidate coding units may be determined with the constraints that are determined based on comparing the sizes of a branch candidate coding unit of the second image and a benchmark coding unit of the first image that corresponds to the branch candidate coding unit as described above.

At S634, additional extension branch candidate coding units can be identified according to a predetermined rule. In some examples, after determining a set of preliminary candidate coding units for partitioning the second image based on the first coding tree structure, for each leaf candidate coding unit of the set of preliminary candidate coding units, extension branch candidate coding units can be identified as the branch candidate coding units. In some examples, the extension branch candidate coding units are set not to be greater than a predetermined number of splitting level(s) from the leaf candidate coding unit.

In some other examples, after determining a set of preliminary candidate coding units for partitioning the second image based on the first coding tree structure, for each leaf candidate coding unit of the set of temporary candidate coding units, neighboring coding units of the second image are identified, where the neighboring coding units are adjacent to the leaf candidate coding unit and can be belong to the second plurality of coding units (e.g., have been tested and determined to be final coding units for the second image). In a case that a size of leaf candidate coding unit is greater than, or greater than or equal to, a corresponding size of the identified neighboring coding units, extension branch candidate coding units can be determined from the leaf candidate coding unit.

In some examples, the predetermined number can be set to one or two. Also, the splitting levels can be determined according to a predetermined partitioning structure.

At S636, the plurality of candidate coding units is obtained as including the set of preliminary candidate coding units and the identified extension branch candidate coding units.

After S636, the process 630 proceeds to S640 in FIG. 6A.

Figure 7:
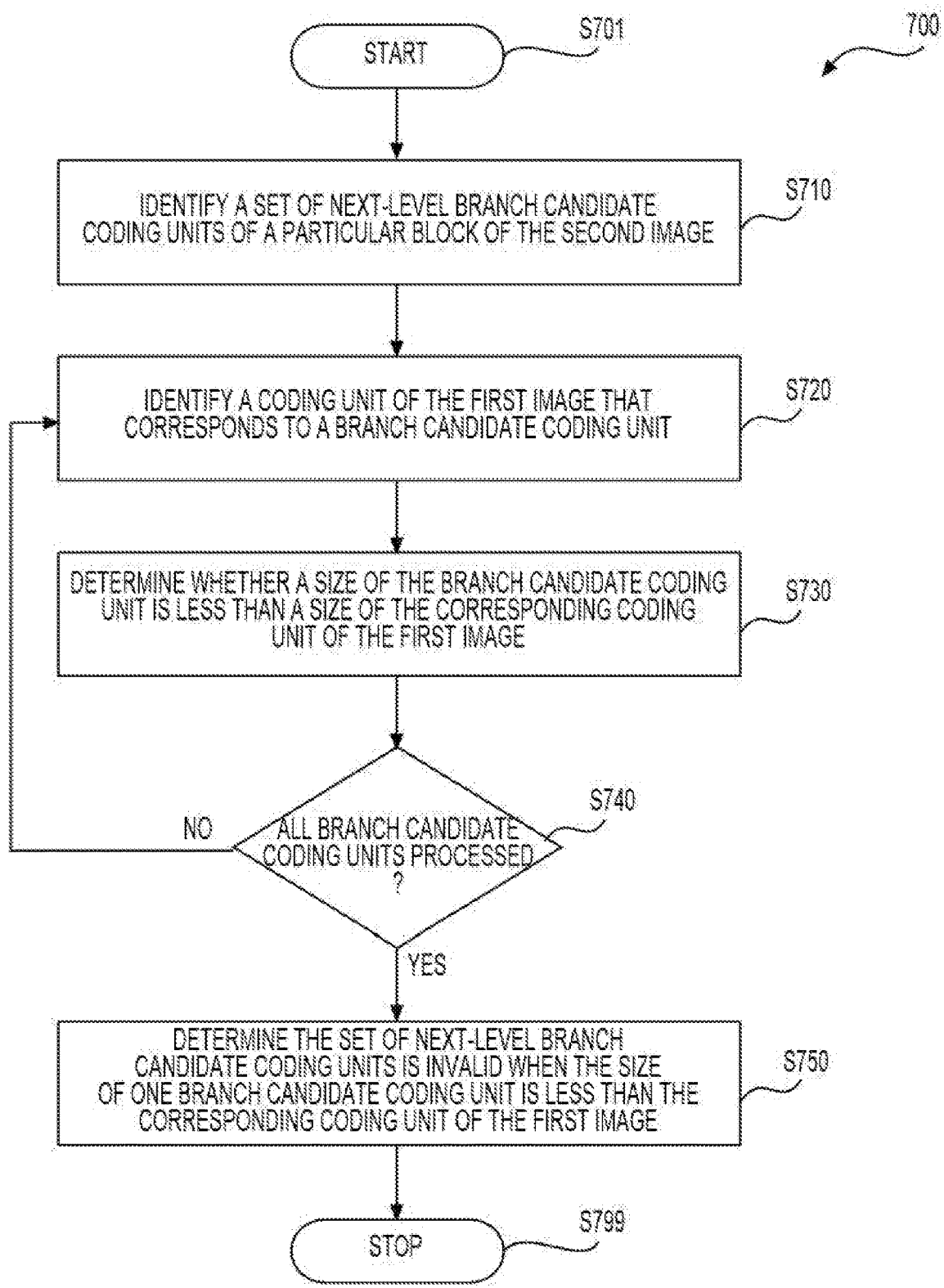
FIG. 7 shows a flow chart outlining an exemplary process for determining whether a set of next-level branch candidate coding units is invalid according to an embodiment of the disclosure.

FIG. 7 shows a flow chart outlining an exemplary process 700 for determining whether a set of next-level branch candidate coding units is invalid according to an embodiment of the disclosure. It is understood that additional operations may be performed before, during, and/or after the process 700 depicted in FIG. 7. The process 700 can be performed at S630 in FIG. 6A or S632 in FIG. 6B in order to determine the constraints for determining candidate coding units for the second image, and the process 700 can be performed by the encoding controller 316 using the partitioning structure estimator 318. The process 700 can also be performed at S830 in FIG. 8A or S834 in FIG. 8B in order to determine the estimated constraints for determining a coding tree structure of the second image, and the process 700 can be performed by the decoding controller 336 using the partitioning structure estimator 338.

The process 700 starts at S701 and proceeds to S710.

At S710, for a particular block of the second image, a set of next-level branch candidate coding units of the second image can be identified. For example, with reference to FIG. 4A-4C, at least three different sets of next-level branch candidate coding units for a block 420 can be identified.

At S720, for a target branch candidate coding unit, a coding unit of the first image that corresponds to the target branch candidate coding unit is identified. For example, the corresponding coding unit of the first image can be identified in a manner as described with reference to FIG. 4A-4C.

At S730, whether a size of the target branch candidate coding unit is less than a size of the corresponding coding unit of the first image is determined. The sizes are the corresponding sizes of the coding units with respect to an original image of the image frame. The size can be an area, a length, or a width of a coding unit with respect to the original or encoded image of the image frame. For example, the sizes of the target branch coding unit and the corresponding coding unit of the first image can be compared in a manner as described with reference to FIG. 4A-4C.

At S740, whether all branch candidate units have been processed according to S720 and S730 is determined. The process proceeds to S720 to repeat S720 and S730 until the sizes of all branch candidate units have been compared with respective coding units of the first image. Afterwards, the process proceeds to S750.

At S750, whether a set of next-level branch candidate coding units is invalid is determined based on the results from S720-S740. In some examples, when the size of one branch candidate coding unit of a particular set of next-level branch candidate coding units is less than the corresponding coding unit of the first image, the entire set of next-level branch candidate coding units is determined to be invalid. For example, a set of next-level branch candidate coding units can be determined to be valid and included as candidate coding units when the sizes all branch candidate coding units thereof are equal to or greater than those of corresponding coding units of the first image. For example, in FIG. 4A, all three sets of next-level branch candidate coding units can be determined as valid. In FIGS. 4B and 4C, depending on the rules for comparison, the set of next-level branch candidate coding units including branch candidate coding units 422, 424, 426, and 428 can be determined as invalid.

After S750, the process proceeds to S799 and terminates.

Figure 8A:
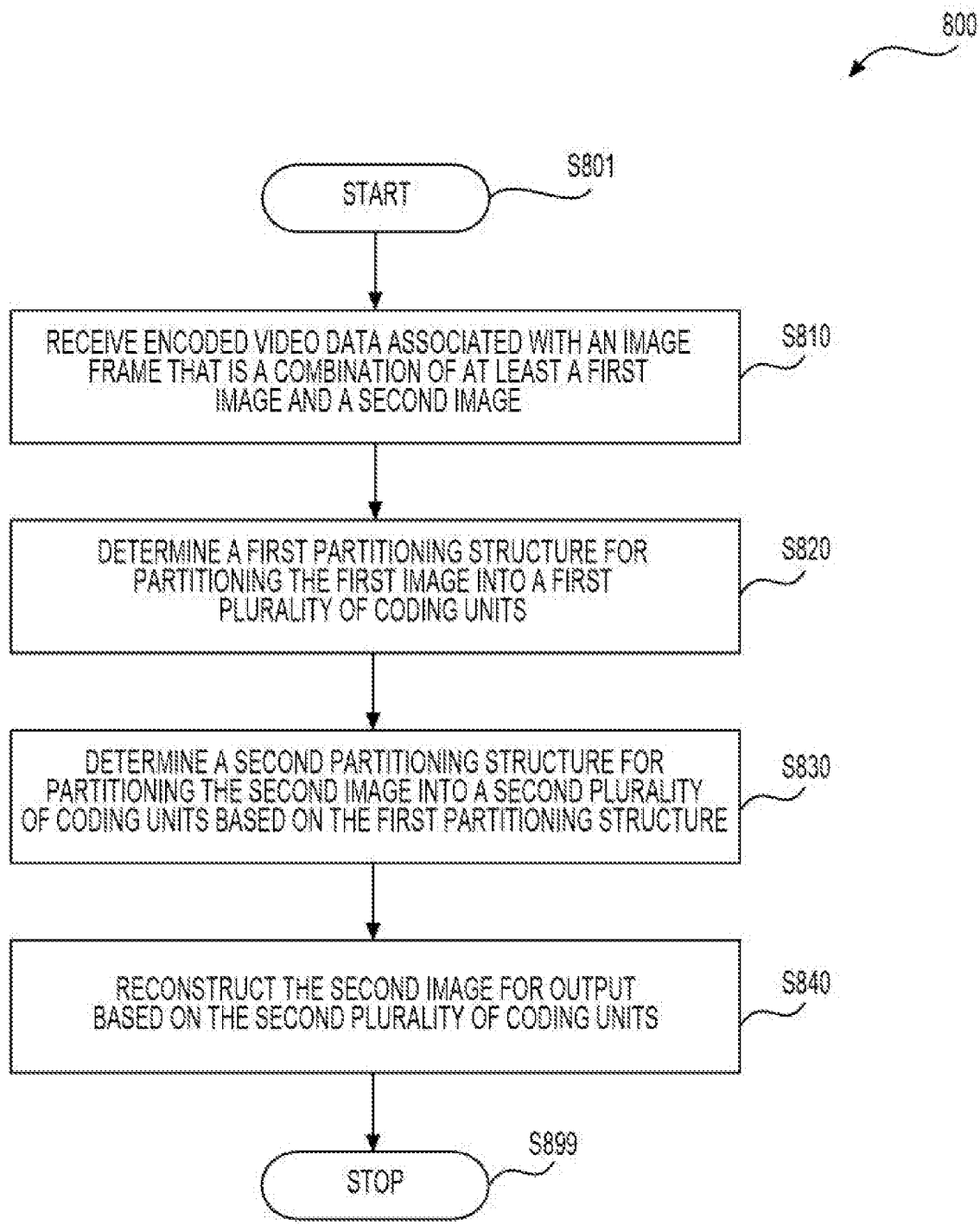
FIG. 8A shows a flow chart outlining an exemplary decoding process using a processing circuit, such as the processing circuit for video decoding in FIG. 3, according to an embodiment of the disclosure.

FIG. 8A shows a flow chart outlining an exemplary decoding process 800 using a processing circuit, such as the processing circuit 330 for video decoding in FIG. 3, according to an embodiment of the disclosure. It is understood that additional operations can be performed before, during, and/or after the process 800 depicted in FIG. 8A. The process 800 starts at S801 and proceeds to S810.

At S810, the encoded video data associated with an image frame that includes an encoded image, which is a combination of at least a first image and a second image is received, where the first and second images correspond to different color space components of a same original image of the image frame. For example, the decoding controller 336 can receive the encoded video data 304 that include encoded data representing a first image and a second image of a same encoded image of an image frame. In some examples, the first image corresponds to a luma color space component, and the second image corresponds to a chroma color space component. In yet some examples, the first image corresponds to a first color space component that is to be encoded at a higher spatial resolution, and the second image corresponds to a second color space component that is to be encoded at a lower spatial resolution lower than that for the first color space component.

At S820, a first partitioning structure for partitioning the first image into a first plurality of coding units is determined. The first partitioning structure can be obtained by decoding the encoded video data. For example, the decoding controller 336 can decode the encoded video data 304 in order to obtain the first partitioning structure and to identify the first plurality of coding units of the first image.

At S830, a second partitioning structure for partitioning the second image into a second plurality of coding units is identified with the assist of the first partitioning structure. For example, the decoding controller 336 can decode the encoded video data 304 in order to obtain some of the coding units of the second image while using the partitioning structure estimator 338 to determine various estimated constraints, such as whether splitting a particular block of the second image into branch candidate coding units is in valid, as described with reference to FIG. 7 and FIGS. 4A-4C or further illustrated with reference to FIG. 8B. By doing so, the decoding controller 336 can optimize the computational resources for decoding the second partitioning structure and thus improve the decoding efficiency. The final result of the second partitioning structure can be fully decoded from the encoded video data 304 with the partitioning constraints information to optimize the processing threads. The final result of the second partitioning structure can also be partially decoded from the encoded video data 304 and partially derived from the partitioning constraints information.

At S840, the second image of the image frame can be reconstructed for output based on the second plurality of coding units. For example, the decoding controller 336 together with the predictor generator 332 and the residual decoder 334 can reconstruct the second image based on the second partitioning structure from S830 and the corresponding coding units.

After S840, the process proceeds to S899 and terminates.

Figure 8B:
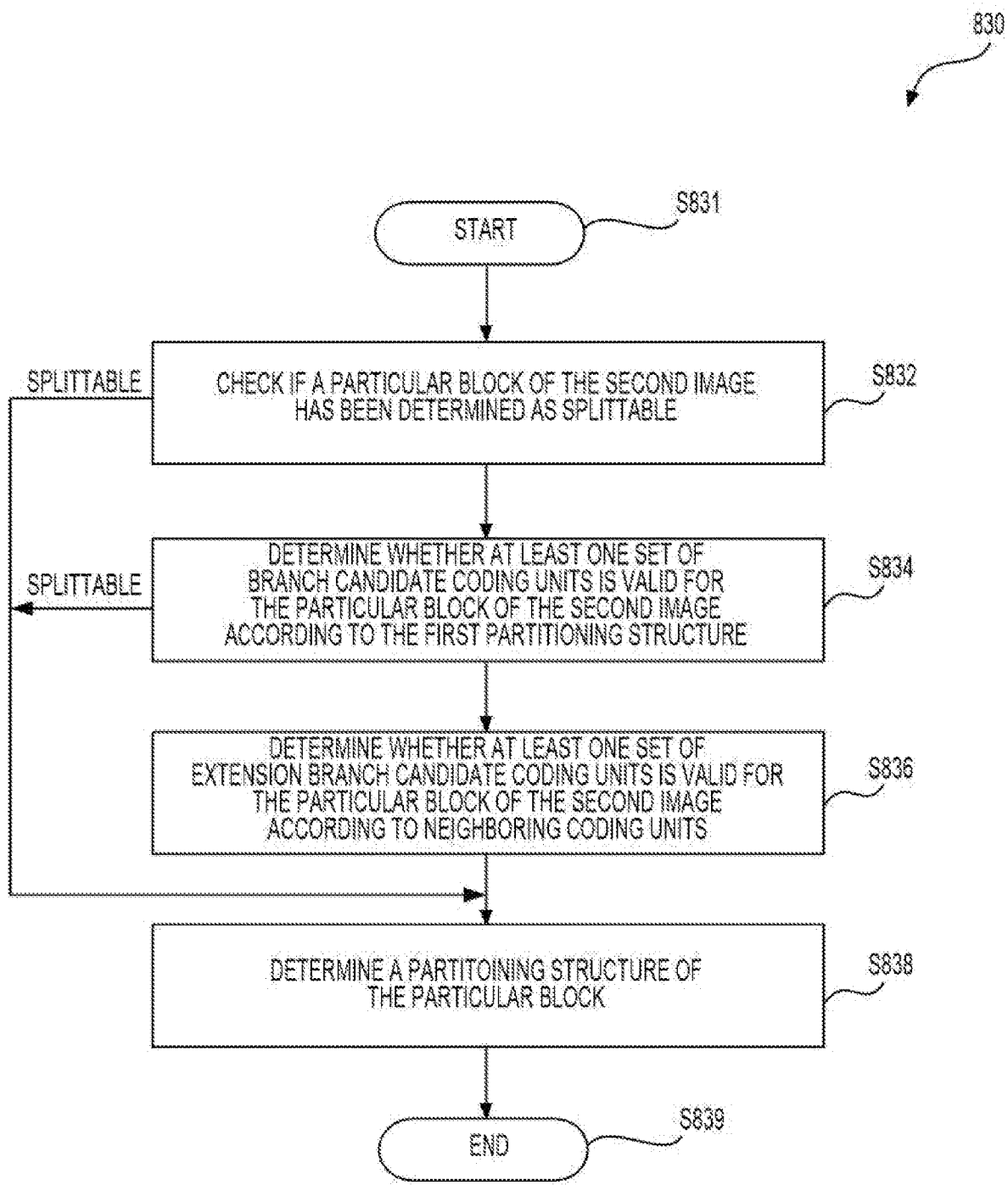
FIG. 8B shows a flow chart outlining exemplary operations for determining a partitioning structure, such as a portion of S830 in FIG. 8A, according to an embodiment of the disclosure.

FIG. 8B shows a flow chart 830 outlining exemplary operations for determining a partitioning structure, such as a portion of S830 in FIG. 8A, according to an embodiment of the disclosure. The process 830 corresponding to analyzing whether splitting a particular block is invalid and determining the partitioning structure of the particular block accordingly. It is understood that additional operations can be performed before, during, and/or after the process 830 depicted in FIG. 8B. The process 830 can be performed repetitively for processing various subdivisions or blocks of an image at various splitting levels. The process 830 can be performed by the decoding controller 336 using the partitioning structure estimator 338.

The process 830 starts at S831 and proceeds to S832.

At S832, whether a particular block of a second image that corresponds to a second color space component of the image frame has been previous determined as splittable is checked. For example, whether splitting the particular block into branch candidate coding units can have been determined as valid, because of the rules based on identifying extension branch candidate coding units as described with reference to FIGS. 4A-5C or the results of S836 from previous iteration of the process 830. In some examples, in a case the particular block has been determined as splittable, or has been determined that splitting the particular block into branch candidate coding units is valid, the process can proceed to S838 without performing S834 and/or S836. In some examples when S836 is omitted in previous iteration of performing process 830, S832 of a current iteration of performing process 830 can also be omitted.

At S834, whether splitting the particular block is invalid is determined based on whether at least one set of branch candidate coding unit is valid for the particular block of the second image according to the first partitioning structure for partitioning the first image. In some examples, a set of branch candidate coding units of the particular block can be identified and whether the set of branch candidate coding units is valid can be determined based on comparing the sizes of a branch candidate coding unit of the second image and a benchmark coding unit of the first image that corresponds to the branch candidate coding unit as described with reference to FIG. 7. In some examples, in a case the particular block is determined as splittable or splitting the particular block into branch candidate coding units is determined to be valid at S834, the process can proceed to S838 without performing S836. In some examples, S832 and S836 can be omitted.

At S836, whether splitting the particular block is invalid is determined based on whether at least one set of extension branch candidate coding units is valid for the particular block.

In some examples, in a case that whether the particular block is splittable has not been determined at S832 and splitting the particular block of the second image into branch candidate coding units is determined to be invalid according to a size of the particular block of the second image and a size of a corresponding one of the first plurality of coding units at S834, splitting the particular block into candidate subdivisions of the particular block can be determined as valid. In some examples, the candidate subdivisions can be valid as long as they are not greater than a predetermined number of splitting level(s) from the particular block.

In some examples, in a case that whether the particular block is splittable has not been determined at S832, whether splitting the particular block into branch coding units can be further determined according to a size of the particular block of the second image and a corresponding size of neighboring coding units in a manner as described with reference to FIGS. 5A-5B. The neighboring coding units of the particular block of the second image can be identified as those adjacent to the particular block. In some examples, in a case that a size of the particular block is greater than, or greater than or equal to, a corresponding size of the identified neighboring coding units, determine that splitting the particular block of the second image into branch candidate coding units is valid. In addition, in some examples, in a case that whether the particular block is splittable has not been determined at S832 and splitting the particular block of the second image into branch candidate coding units is determined to be invalid according to the size of the particular block of the second image and the corresponding size of the identified neighboring coding units, splitting the particular block into candidate subdivisions of the particular block can be determined as valid. In some examples, the candidate subdivisions can be valid as long as they are not greater than a predetermined number of splitting level(s) from the particular block.

At S838, the partitioning structure of the particular block can be determined based on the results from S832, S834, and/or S836.

After S838, the process 830 proceeds to S899 and terminates. The process 830 can be performed repetitively for processing various subdivisions or blocks of an image at various splitting levels.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A video decoding device, comprising:
a processing circuit configured to:
receive encoded video data associated with an image frame that includes an encoded image, which is a combination of at least a first image corresponding to a first color space component of the image frame and a second image corresponding to a second color space component of the image frame;
determine a first coding tree structure for partitioning the first image into a first plurality of coding units;
determine a second coding tree structure for partitioning the second image into a second plurality of coding units, including determining whether splitting a particular block of the second image into branch candidate coding units is invalid according to a size of the particular block of the second image and a size of one or more coding units of the first plurality of coding units corresponding to the particular block of the second image; and reconstruct the second image for output based on the second plurality of coding units, wherein the processing circuit is further configured to determine whether splitting the particular block of the second image into branch candidate coding units is invalid by performing:

for each branch candidate coding unit of a set of next-level branch candidate coding units of the particular block, identifying a benchmark block in the first image according to the first plurality of coding units that corresponds to the branch candidate coding unit, and determining whether a size of the branch candidate coding unit with respect to the encoded image is less than a size of the benchmark block with respect to the encoded image; and determining the set of next-level branch candidate coding units is invalid in a case that the size of one of the set of next-level branch candidate coding units with respect to the encoded image is less than the size of the corresponding benchmark block with respect to the encoded image.

2. The video decoding device according to claim 1, wherein the size of a particular branch candidate coding unit of the second image is determined based on an area of a first region in the encoded image that corresponds to the particular branch candidate coding unit; and the size of a benchmark block in the first image is determined based on an area of a second region in the encoded image that corresponds to the benchmark block.

3. The video decoding device according to claim 1, wherein the size of a particular branch candidate coding unit of the second image is determined based on a width or a height of a first region in the encoded image that corresponds to the particular branch candidate coding unit; and the size of a benchmark block in the first image is determined based on a width or a height of a second region in the encoded image that corresponds to the benchmark block.

4. The video decoding device according to claim 1, wherein the processing circuit is further configured to:

in response to a first determination that splitting the particular block of the second image into the branch candidate coding units is invalid according to the size of the particular block of the second image and the size of the one or more coding units of the first plurality of coding units corresponding to the particular block of the second image, determine candidate subdivisions of the particular block that are not greater than a predetermined number of splitting level(s) from the particular block as valid in place of the first determination.

5. The video decoding device according to claim 4, wherein the predetermined number is one or two.

6. The video decoding device according to claim 1, wherein the processing circuit is further configured to:

identify neighboring coding units of the particular block of the second image, the neighboring coding units being adjacent to the particular block; and in a case that the size of the particular block is greater than, or greater than or equal to, a corresponding size of the identified neighboring coding units, determine that splitting the particular block of the second image into branch candidate coding units is valid.

7. The video decoding device according to claim 6, wherein the processing circuit is further configured to:

in response to a second determination that splitting the particular block of the second image into the branch candidate coding units is invalid according to the size of the particular block of the second image and the corresponding size of the identified neighboring coding units, determine candidate subdivisions of the particular block that are not greater than a predetermined number of splitting level(s) from the particular block as valid in place of the second determination.

8. A video decoding method, comprising:

receiving encoded video data associated with an image frame that includes an encoded image, which is a combination of at least a first image corresponding to a first color space component of the image frame and a second image corresponding to a second color space component of the image frame;

determining, by a processing circuit, a first coding tree structure for partitioning the first image into a first plurality of coding units;

determining, by the processing circuit, a second coding tree structure for partitioning the second image into a second plurality of coding units, including determining whether splitting a particular block of the second image into branch candidate coding units is invalid according to a size of the particular block of the second image and a size of one or more coding units of the first plurality of coding units corresponding to the particular block of the second image; and reconstructing the second image for output based on the second plurality of coding units, wherein the determining whether splitting the particular block of the second image into branch candidate coding units is invalid comprises:

for each branch candidate coding unit of a set of next-level branch candidate coding units of the particular block, identifying a benchmark block in the first image according to the first plurality of coding units that corresponds to the branch candidate coding unit, and determining whether a size of the branch candidate coding unit with respect to the encoded image is less than a size of the benchmark block with respect to the encoded image; and determining the set of next-level branch candidate coding units is invalid in a case that the size of one of the set of next-level branch candidate coding units with respect to the encoded image is less than the size of the corresponding benchmark block with respect to the encoded image.

9. The video decoding method according to claim 8, wherein the size of a particular branch candidate coding unit of the second image is determined based on an area of a first region in the encoded image that corresponds to the particular branch candidate coding unit; and the size of a benchmark block in the first image is determined based on an area of a second region in the encoded image that corresponds to the benchmark block.

10. The video decoding method according to claim 8, wherein the size of a particular branch candidate coding unit of the second image is determined based on a width or a height of a first region in the encoded image that corresponds to the particular branch candidate coding unit; and the size of a benchmark block in the first image is determined based on a width or a height of a second region in the encoded image that corresponds to the benchmark block.

11. The video decoding method according to claim 8, further comprising:

in response to a first determination that splitting the particular block of the second image into the branch candidate coding units is determined to be invalid according to the size of the particular block of the second image and the size of the one or more coding units of the first plurality of coding units corresponding to the particular block of the second image, determining candidate subdivisions of the particular block that are not greater than a predetermined number of splitting level(s) from the particular block as valid in place of the first determination.

12. The video decoding method according to claim 11, wherein the predetermined number is one or two.

13. The video decoding method according to claim 8, further comprising:

identifying neighboring coding units of the particular block of the second image, the neighboring coding units being adjacent to the particular block; and in a case that the size of the particular block is greater than, or greater than or equal to, a corresponding size of the identified neighboring coding units, determining that splitting the particular block of the second image into branch candidate coding units is valid.

14. The video decoding method according to claim 13, further comprising:

in response to a second determination that splitting the particular block of the second image into the branch candidate coding units is determined to be invalid according to the size of the particular block of the second image and the corresponding size of the identified neighboring coding units, determining candidate subdivisions of the particular block that are not greater than a predetermined number of splitting level(s) from the particular block as valid in place of the second determination.

15. A video encoding device, comprising:

a processing circuit configured to:

receive an image frame that includes an original image, which is a combination of at least a first image corresponding to a first color space component of the image frame and a second image corresponding to a second color space component of the image frame;

determine a first coding tree structure for partitioning the first image into a first plurality of coding units;

determine a plurality of candidate coding units for partitioning the second image, including determining whether splitting a particular block into branch candidate coding units is invalid according to a size of the particular block and a size of one or more coding units of the first plurality of coding units corresponding to the particular block;

determine a second coding tree structure for partitioning the second image into a second plurality of coding units based on the plurality of candidate coding units; and generate encoded data representing the second image for output according to the second plurality of coding units, wherein the processing circuit is further configured to determine whether splitting the particular block of the second image into branch candidate coding units is invalid by performing:

for each branch candidate coding unit of a set of next-level branch candidate coding units of the particular block, identifying a benchmark block in the first image according to the first plurality of coding units that corresponds to the branch candidate coding unit, and determining whether a size of the branch candidate coding unit with respect to the original image is less than a size of the benchmark block with respect to the original image; and determining the set of next-level branch candidate coding units is invalid in a case that the size of one of the set of next-level branch candidate coding units with respect to the original image is less than the size of the corresponding benchmark block with respect to the original image.

16. The video encoding device according to claim 15, wherein the size of a particular branch candidate coding unit of the second image is determined based on an area of a first region in the original image that corresponds to the particular branch candidate coding unit; and the size of a benchmark block in the first image is determined based on an area of a second region in the original image that corresponds to the benchmark block.

17. The video encoding device according to claim 15, wherein the size of a particular branch candidate coding unit of the second image is determined based on a width or a height of a first region in the original image that corresponds to the particular branch candidate coding unit; and the size of a benchmark block in the first image is determined based on a width or a height of a second region in the original image that corresponds to the benchmark block.

18. The video encoding device according to claim 15, wherein the processing circuit is further configured to:

determine a set of preliminary candidate coding units for partitioning the second image based on the first coding tree structure;

for a leaf candidate coding unit of the set of preliminary candidate coding units, identify extension branch candidate coding units that are not greater than a predetermined number of splitting level(s) from the leaf candidate coding unit; and obtain the plurality of candidate coding units to include the set of preliminary candidate coding units and the identified extension branch candidate coding units.

19. The video encoding device according to claim 18, wherein the predetermined number is one or two.

20. The video encoding device according to claim 15, wherein the processing circuit is further configured to:

determine a set of preliminary candidate coding units for partitioning the second image based on the first coding tree structure;

for a leaf candidate coding unit of the set of preliminary candidate coding units, identify neighboring coding units of the second image, the neighboring coding units being adjacent to the leaf candidate coding unit, and in a case that a size of leaf candidate coding unit is greater than, or greater than or equal to, a corresponding size of the identified neighboring coding units, identify extension branch candidate coding units of the leaf candidate coding unit; and obtain the plurality of candidate coding units to include the set of preliminary candidate coding units and the identified extension branch candidate coding units.

21. The video encoding device according to claim 20, wherein the processing circuit is further configured to:

for the leaf candidate coding unit of the set of preliminary candidate coding units, in the case that the size of leaf candidate coding unit is greater than, or greater than or equal to, the corresponding size of the identified neighboring coding units, identify extension branch candidate coding units of the leaf candidate coding unit that are not greater than a predetermined number of splitting level(s) from the leaf candidate coding unit.

22. A video encoding method, comprising:

receiving an image frame that includes an original image, which is a combination of at least a first image corresponding to a first color space component of the image frame and a second image corresponding to a second color space component of the image frame;

determining a first coding structure for partitioning the first image into a first plurality of coding units;

determining, by a processing circuit, a plurality of candidate coding units for partitioning the second image, including determining whether splitting a particular block into branch candidate coding units is invalid according to a size of the particular block and a size of one or more coding units of the first plurality of coding units corresponding to the particular block;

determining, by the processing circuit, a second coding tree structure for partitioning the second image into a second plurality of coding units based on the plurality of candidate coding units; and generating, by the processing circuit, encoded data representing the second image for output according to the second plurality of coding units wherein the determining whether splitting the particular block of the second image into branch candidate coding units is invalid comprises:

for each branch candidate coding unit of a set of next-level branch candidate coding units of the particular block, identifying a benchmark block in the first image according to the first plurality of coding units that corresponds to the branch candidate coding unit, and determining whether a size of the branch candidate coding unit with respect to the original image is less than a size of the benchmark block with respect to the original image; and determining the set of next-level branch candidate coding units is invalid in a case that the size of one of the set of next-level branch candidate coding units with respect to the original image is less than the size of the corresponding benchmark block with respect to the original image.

23. The video encoding method according to claim 22, wherein the size of a particular branch candidate coding unit of the second image is determined based on an area of a first region in the original image that corresponds to the particular branch candidate coding unit; and the size of a benchmark block in the first image is determined based on an area of a second region in the original image that corresponds to the benchmark block.

24. The video encoding method according to claim 22, wherein the size of a particular branch candidate coding unit of the second image is determined based on a width or a height of a first region in the original image that corresponds to the particular branch candidate coding unit; and the size of a benchmark block in the first image is determined based on a width or a height of a second region in the original image that corresponds to the benchmark block.

25. The video encoding method according to claim 22, wherein the determining the plurality of candidate coding units comprises:

determining a set of preliminary candidate coding units for partitioning the second image based on the first coding tree structure;

for a leaf candidate coding unit of the set of preliminary candidate coding units, identifying extension branch candidate coding units that are not greater than a predetermined number of splitting level(s) from the leaf candidate coding unit; and obtaining the plurality of candidate coding units to include the set of preliminary candidate coding units and the identified extension branch candidate coding units.

26. The video encoding method according to claim 25, wherein the predetermined number is one or two.

27. The video encoding method according to claim 22, wherein the determining the plurality of candidate coding units comprises:

determining a set of preliminary candidate coding units for partitioning the second image based on the first coding tree structure;

for a leaf candidate coding unit of the set of preliminary candidate coding units, identifying neighboring coding units of the second image, the neighboring coding units being adjacent to the leaf candidate coding unit, and in a case that a size of leaf candidate coding unit is greater than, or greater than or equal to, a corresponding size of the identified neighboring coding units, identifying extension branch candidate coding units of the leaf candidate coding unit; and obtaining the plurality of candidate coding units to include the set of preliminary candidate coding units and the identified extension branch candidate coding units.

28. The video encoding method according to claim 27, wherein the determining the plurality of candidate coding units comprises:

for the leaf candidate coding unit of the set of preliminary candidate coding units, in the case that the size of leaf candidate coding unit is greater than, or greater than or equal to, the corresponding size of the identified neighboring coding units, identifying extension branch candidate coding units of the leaf candidate coding unit that are not greater than a predetermined number of splitting level(s) from the leaf candidate coding unit.

29. The video decoding device according to claim 1, wherein the first coding tree structure is recorded according to a quadtree plus binary tree (QTBT) partitioning structure, and the second coding tree structure is recorded according to the QTBT partitioning structure.

30. The video decoding device according to claim 1, wherein the first color space component is a luma color component, and the second color space component is a chroma color component.

* * * * *